United States Patent [19]
Sanchez-Lazer et al.

[11] Patent Number: 6,000,945
[45] Date of Patent: Dec. 14, 1999

[54] SYSTEM AND METHOD FOR COMPUTER BASED TEST ASSEMBLY

[75] Inventors: Teresa Sanchez-Lazer, Hopewell, N.J.; Richard Burns, Yardley, Pa.; Gary Driscoll, Pennington; Linda Tyler, Ringoes, both of N.J.; Barbara Keener, New Hope; David Kuntz, Yardley, both of Pa.; Kenneth Willian, Princeton, N.J.

[73] Assignee: Educational Testing Service, Princeton, N.J.

[21] Appl. No.: 09/020,755

[22] Filed: Feb. 9, 1998

[51] Int. Cl.⁶ .................................................. G09B 3/00
[52] U.S. Cl. .................... 434/322; 434/118; 434/350; 434/362; 706/927
[58] Field of Search ................ 434/118, 322–325, 434/337, 350, 353–362, 365; 706/45, 52, 915, 927; 704/2–10; 707/100–104; 381/51

[56] References Cited

U.S. PATENT DOCUMENTS

| | | |
|---|---|---|
| 4,895,518 | 1/1990 | Arnold et al. ...................... 434/350 X |
| 5,261,823 | 11/1993 | Kurokawa ................................ 434/323 |
| 5,306,154 | 4/1994 | Ujita et al. ........................... 434/362 X |
| 5,565,316 | 10/1996 | Kershaw et al. . |
| 5,597,311 | 1/1997 | Yanagida et al. .................... 434/362 X |
| 5,810,605 | 9/1998 | Siefert ................................ 434/350 X |
| 5,829,983 | 11/1998 | Koyama et al. ..................... 434/362 X |
| 5,870,731 | 2/1999 | Trif et al. ............................. 434/118 X |

Primary Examiner—Joe H. Cheng
Attorney, Agent, or Firm—Woodcock Washburn Kurtz Mackiewicz & Norris LLP

[57] ABSTRACT

A computer-based test assembly system and method for generating an assembly of test items. The test assembly process includes creating tests in electronic form from already-existing test items and allowing access by a plurality of assembly personnel and reviewers via a network. Assemblers select test items on-line for inclusion in an assembly. Electronic selection is accomplished by means of an automated item selection algorithm or through a manual, but electronic series of queries. The test assembly process also includes an automated test layout feature which automatically assembles a test from the selected items. When a test is assembled, an assembler uses an automated documentation feature which generates a comprehensive documentation of the completed assembly.

15 Claims, 19 Drawing Sheets

FIG. 1 (PRIOR ART)

18 — Questions 8-27 each consist of two quantities, one in Column A and one in Column B. You are to compare the two quantities and on the answer sheet fill in oval — 16

A if the quantity in Column A is greater;
B if the quantity in Column B is greater;
C if the two quantities are equal;
D if the relationship cannot be determined from the information given.

AN E RESPONSE WILL NOT BE SCORED

Notes:
1. In certain questions, information concerning one or both of the quantities to be compared is centered above the two columns.
2. In a given question, a symbol that appears in both columns represents the same thing in Column A as it does in Column B.
3. Letters such as $x$, $n$, and $k$ stand for real numbers.

| | EXAMPLES | | |
|---|---|---|---|
| | Column A | Column B | Answers |
| E1. | $2 \times 6$ | $2 + 6$ | ● ○ ○ ○ ○ A B C D E |
| E2. | $180-x$ | $y$ | ○ ○ ● ○ ○ A B C D E |
| E3. | $p-q$ | $q-p$ | ○ ○ ○ ● ○ A B C D E |

(E2 includes a figure showing two angles $x°$ and $y°$ on a straight line)

| | Column A | Column B |
|---|---|---|
| 8. | $\frac{1}{2} - \frac{2}{5}$ | $\frac{1}{2} - \frac{2}{3}$ |

$r$, $s$, and $t$ are the degree measures of the three angles of a triangle

| 9. | $r + s$ | $t$ |

$n > 0$

| 10. | $0.42 \times n$ | $0.042 \times 10n$ |

$\frac{3}{a} = \frac{b}{4}$

| 11. | $ab$ | 12 |

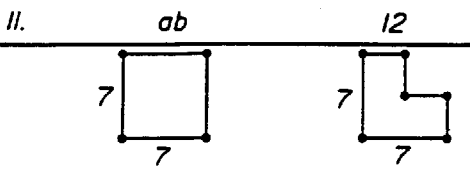

In Figures A and B, pairs of line segments that meet at a point are perpendicular.

| 12. | The perimeter of Figure A | The perimeter of Figure B |

Questions 13-14 refer to the following graph.

YIELD OF CROP P AT VARYING TEMPERATURES AND LIGHT INTENSITIES

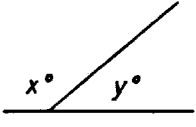

13. For the temperature range shown, the highest yield, in bushels, of crop P at light intensity II — 45

At light intensity III, for the temperature range shown, the highest yield, in bushels, of crop P is H and the lowest is L.

| 14. | $H - L$ | 30 |

FIG. 8

Test Creation Test Form — 1 By Form Code — Lotus Notes
File Edit View Create Actions Window Help ◀ Create Test Form — Main    ◀ Back to Main Menu

| Test Form Code | Test ID | Section ID | Name | Type | # Sections | Sequence | F |
|---|---|---|---|---|---|---|---|
| ▶ 3SGR7-S122 | | | | | | | |
| | ▶ VB134003 | Main | GRE | Normal | 7 | | R |
| | | VB134004 | GRE Quantitative Skills | Pretest | 7 | 1 | |
| ▶ 3SGR7-S100 | | | | | | | |
| | ▶ KH328843 | Main | GRE | Normal | 7 | | R |
| | | KH328844 | GRE Verbal Skills | Pretest | 7 | 1 | |
| ▶ 3SGR7-S122 | | | | | | | |
| | ▶ KH328808 | Main | GRE | Normal | 7 | | R |
| | | KH328809 | GRE Quantitative Skills | Pretest | 7 | 1 | |
| ▶ 3SGR7-S123 | | | | | | | |
| | ▶ KH328813 | Main | GRE | Normal | 7 | | R |
| | | KH328814 | GRE Quantitative Skills | Pretest | 7 | 1 | |
| ▶ 3SGR7-S124 | | | | | | | |
| | ▶ KH328815 | Main | GRE | Normal | 7 | | R |
| | | KH328816 | GRE Quantitative Skills | Pretest | 7 | 1 | |
| ▶ 3SGR7-S125 | | | | | | | |
| | ▶ KH328817 | Main | GRE | Normal | 7 | | R |
| | | KH328818 | GRE Quantitative Skills | Pretest | 7 | 1 | |

Main Menu:
Test Form Code
Package Code
Metrics: Cycle Time
Metrics: Counts

Office

FIG. 9

TAS Worksheet - [gregstat]
File  Edit  Display  Browser  Records  Tools  Window  Help

| | Selected | AccNum | SetNum | SetStatus | Seq | Use | Misc | Excluded | Key | L. Status | DIClass | |
|---|---|---|---|---|---|---|---|---|---|---|---|---|
| 1 | ☐ | VB100023 | | Discrete | | | | ☐ | C | 1.0 | Data Analysis | AV |
| 2 | ☑ | VB100024 | | Discrete | | | | ☐ | a | 1.0 | Algebra | EP |
| 3 | ☑ | VB100025 | | Discrete | | | | ☐ | B | 1.0 | Algebra | LE |
| 4 | ☑ | VB100028 | | Discrete | | | | ☐ | D | 1.0 | Geometry | LS |
| 5 | ☐ | VB100029 | | Discrete | | | | ☐ | B | 1.0 | Geometry | CA |
| 6 | ☐ | VB100030 | | Discrete | | | | ☐ | D | 1.0 | Algebra | AB |
| 7 | ☑ | VB100031 | | Discrete | | | | ☐ | D | 1.0 | Arithmetic | SY |
| 8 | ☑ | VB100032 | | Discrete | | | | ☐ | B | 1.0 | Arithmetic | FM |
| 9 | | VB100034 | | Discrete | | | | ☐ | C | 1.0 | Data Analysis | PR |
| 10 | ☐ | VB100035 | | Discrete | | | | ☐ | D | 1.0 | Algebra | SY |
| 11 | ☐ | VB100036 | | Discrete | | | | ☐ | C | 1.0 | Geometry | TA |
| 12 | ☐ | VB100052 | | Discrete | | | | ☐ | a | 1.0 | Arithmetic | FM |
| 13 | ☐ | VB100053 | | Discrete | | | | ☐ | B | 1.0 | Arithmetic | PO |
| 14 | ☐ | VB100055 | | Discrete | | | | ☐ | D | 1.0 | Arithmetic | EP |
| 15 | ☐ | VB100057 | | Discrete | | | | ☐ | B | 1.0 | Algebra | QE |
| 16 | ☐ | VB100060 | | Discrete | | | | ☐ | D | 1.0 | Algebra | LE |
| 17 | ☐ | VB100062 | | Discrete | | | | ☐ | A | 1.0 | Arithmetic | PF |
| 18 | ☐ | VB100063 | | Discrete | | | | ☐ | D | 1.0 | Algebra | FF |
| 19 | ☐ | VB100065 | | Discrete | | | | ☐ | A | 1.0 | Geometry | GG |
| 20 | ☐ | VB100069 | | Discrete | | | | ☐ | D | 1.0 | Data Analysis | MM |
| 21 | ☐ | VB100071 | | Discrete | | | | ☐ | C | 1.0 | Geometry | AP |
| 22 | ☐ | VB100072 | | Discrete | | | | ☐ | D | 1.0 | Arithmetic | SS |
| 23 | ☐ | VB100073 | | Discrete | | | | ☐ | B | 1.0 | Arithmetic | LIL |
| 24 | ☐ | VB100074 | | Discrete | | | | ☐ | C | 1.0 | Arithmetic | PV |
| 25 | ☐ | VB100075 | | Discrete | | | | ☐ | D | 1.0 | Arithmetic | FM |
| 26 | ☐ | VB100076 | | Discrete | | | | ☐ | C | 1.0 | Algebra | QE |
| 27 | ☐ | VB100077 | | Discrete | | | | ☐ | B | 1.0 | Algebra | QE |

Total 152 items. 152 discretes. 0 set members. 0 set leaders.

FIG. 10

Prepare AIS

General Specification

Source Worksheets: greqstat

Constraint Sets: AIS-tsl

Number of Tests: 1

Number of item/test: 39

☑ Include All Sets
☑ Include All Discretes
☐ Set Leader can be reused
☐ Exclude "excluded" items Random Number Seed: 6787

Target Curve Information

Lower Target:     Upper Target:     Target Weight:

☐ Item Information
☐ Test Characteristic Curve
☐ Delta Distribution

OK     Cancel 116
114

*FIG. 13*

SYSTEM AND METHOD FOR COMPUTER BASED TEST ASSEMBLY

FIELD OF THE INVENTION

This invention generally relates to the field of computer-based test assembly systems, and more particularly, to the on-line selection and assembly of test items into tests.

BACKGROUND OF THE INVENTION

For many years, standardized tests have been administered to examinees for various reasons such as for educational testing or for evaluating particular skills. For instance, academic skills tests, e.g., SATs, LSATs, GMATs, etc., are typically administered to a large number of students. Results of these tests are used by colleges, universities and other educational institutions as a factor in determining whether an examinee should be admitted to study at that particular institution. Other standardized testing is carried out to determine whether or not an individual has attained a specified level of knowledge, or mastery, of a given subject. Such testing is referred to as mastery testing, e.g., achievement tests offered to students in a variety of subjects and the results being used for college credit in such subjects.

FIG. 1 depicts a sample question and related directions which might be given on a standardized test. The stem 12, the stimulus 14, responses 16, and directions 18 for responding to the stem 12 are collectively referred to as an item. The stimulus 14 is the text and/or graphical information, e.g., a map, scale, graph, or reading passage, to which a stem 12 may refer.

After all of the examinees' tests are graded, statistical and other processing may be provided for various reasons. For instance, to assess an examinee's score, it is necessary to compare his or her score to those of other examinees taking the same test. Another important reason to evaluate the test results for statistical purposes is to create and update an information bank containing the performance statistics of each item used or created for previous tests. This information may then be used for the creation and assembly of future tests.

A goal of standardized testing is to efficiently construct a test for the purpose of measuring a skill, ability, etc. Therefore, each test is constructed to conform to a test specification which defines the rules and/or constraints for selecting the items. In constructing a test, test developers select items from inventory of items so that the combination of selected items satisfy the test specification.

A test is typically divided into sections of questions. The test specification generally defines the number of items to be presented in the test, the number of test sections, the number of questions in each section, the time for taking the test, and the allotted time for responding to all the items in each test section. The test specification also specifies criteria for item selection. These are based on at least four item characteristics which include: (1) item content, e.g., mathematical questions relating to arithmetic, algebra, or geometry; (2) cross-information among items, e.g., more than one item testing the same point; (3) number of items/set, i.e., identification of a subset of items of a larger set; and (4) statistical properties of items derived from pretesting, e.g. difficulty of the selected items.

In recent years, the methods for creating, delivering, administering, and scoring tests have been determined to be inadequate. Due to the number of examinees taking standardized tests, there is increasing demand for developing new and more diverse tests and an increasing need to provide more flexibility in scheduling tests without sacrificing administration costs and security. One solution to these demands would be to automate the entire testing process. Only a few attempts have been made, however, to automate only portions of the testing process. Furthermore, these attempts are limited in their ability to select items from a given inventory of items.

For example, a prior art computerized testing system, "TD/DC," is disclosed in U.S. Pat. No. 5,565,316, entitled "System and Method for Computer Based Testing" and assigned to Educational Testing Service, Princeton, N.J. The TD/DC system, however, has drawbacks in that the assembly stage is not automated. During the test assembly or packaging stage of the TD/DC system, much of the work has to be done manually through the use of paper copies and work folders. In particular, an assembler pulls the appropriate number of each type of item using paper copies and sequences the items in a work folder. Editors work with marked-up paper copies and assemblers have to check copies sent to the printer with the paper originals.

Basically, the prior art system has numerous poorly-integrated steps. Additionally, those steps which are automated involve several software packages running on incompatible platforms such as Unix, OS2, Macintosh, and DOS. Because reviews and changes occurred throughout the process and reviews largely occurred from paper copies, steps were necessitated to make changes to electronic files and to keep the files in all the systems reconciled.

Because the entire test assembly process is not automated, the TD/DC system involves many steps and "hand-offs" of the item/work folder. With so many hand-offs, much time is wasted waiting for a user to pass the work folder off to the next user. For example, on the math section of the SAT test, only 22% of the elapsed time to create an item is actually spent working on that test. Moreover, on the GRE Chemistry test, 30% of the total working time is spent making transcriptions between paper and computer. An automated test assembly system is desired which will streamline the test assembly process by making the process more efficient and reducing the required number of steps and hand-offs.

Another drawback of the prior art systems is that item selection is not efficient. With the prior art system, a user could get 500 test items from a search for test items with particular characteristics. Manually assembling a test with about 50 test items from inventory of 500 is a formidable task. Thus, it is desired to make the item selection process more efficient and automated, allowing users to manipulate pools of items on-line, and thus achieve a finer level of granularity in narrowing down the number of test items in a given inventory before assembling a test.

Another drawback of the prior art test assembly system is that the item selection process had major handicaps in that it had limited information on each test item in its inventory of available items. It is thus desired to provide an inventory of available items with enough data on each item to allow for a more thorough, efficient and finer level of searching and selection.

The main object of the present invention is to address the above-noted problems with the prior art test assembly systems by providing a more efficient test assembly system. The prior art system, i.e., the TD/DC system, lacks efficiency in that much of it is still paper based, it involves numerous steps and hand-offs, and it lacks automatic or automated steps. Thus, the primary object is to improve all aspects of the test assembly system so as to yield an automated and efficient computer-based test assembly system with several automatic features.

SUMMARY OF THE INVENTION

The present invention provides a computer-based test assembly system and method for assembling test items in electronic form. An item repository is provided for storing available test item information. A statistics database is provided for storing statistical information about available test items. An item selection component is provided for electronically selecting a plurality of test items for storing in a worksheet. A test layout component is also provided for producing a test from the selected test items. Typically, the test is a layout of the assembly of test items as it would appear during an administration of the test to test takers. The test, however, can also be a computer adaptive test comprising an adaptive layout of the assembly of test items as it would appear during an administration of the test to a particular test taker, the appearance of each successive test item being dependent on the manner in which the previous test item was answered.

The method for assembling a test in electronic form using the automated test assembly system includes the steps of responding to a test assembly request by determining whether an inventory of available test items can satisfy the test assembly request, electronically creating a worksheet for a test or a test section in which test items are assembled, electronically selecting a plurality of test items for storing in the worksheet, electronically sequencing the plurality of test items in the worksheet so as to produce an assembly of test items, electronically reviewing the assembly of test items for necessary changes in the assembly or for problems with particular test items, making the necessary changes in the assembly and replacing test items having problems with new test items as necessary, producing a test, reviewing the test to ensure that there are no problems with content present, in order to give final approval to the test, and electronically storing the test and data from the worksheet.

A preferred embodiment of the invention includes a method wherein the step of electronically selecting a plurality of test items for storing in the worksheet further includes the steps of developing at least one constraint, the constraint defining at least one characteristic of test items that are needed for the test and inputting the constraint into the item selection component, which preferably is an automated item selection algorithm, by selectively linking them with the Boolean operators "and" or "or." The automated item selection algorithm simultaneously finds the test items that meet all the constraints and places the test items in a temporary worksheet for user evaluation.

A preferred embodiment of the invention also includes a method wherein the step of electronically selecting a plurality of test items for storing in the worksheet further includes the step of placing an upper bound and a lower bound on the number of test items for the automated item selection algorithm to find.

Another preferred embodiment of the invention includes a method for assembling a test in electronic form using an automated test assembly system comprising the steps of developing at least one query in order to search an inventory of available test items for test items, each query defining characteristics of test items that are needed for the test, inputting one query at a time into the test assembly system so as to yield a plurality of test items that satisfy the query, electronically selecting a plurality of test items from the plurality of test items that satisfy the query for storing in a worksheet for a test or a test section in which test items are assembled, and if desired, placing the selected test items in the worksheet.

Another preferred embodiment of the invention includes a method wherein the step of inputting one query at a time further includes the step of, when the test assembly system yields the number of test items that satisfy the query, selectively refining the query to further reduce the desired number of test items.

The method for assembling a test in electronic form using an automated test layout feature of the automated test assembly system is also provided. The method includes executing a plurality of layout macros in the test assembly system, the layout macros being commands that direct the system to electronically retrieve locked, camera-ready versions of each test item and placing them in a predetermined sequence on a test template, and editing the test template to produce a suitable layout of the test pages.

BRIEF DESCRIPTION OF THE DRAWINGS

The present invention will be better understood, and its numerous objects and advantages will become more apparent, by reference to the following detailed description of the invention when taken in conjunction with the following drawings, of which:

FIG. 1 is an example of a written test question or "item" and related directions.

FIG. 8 is the user interface screen for the test forms database of the TCS.

FIG. 9 is a TAS worksheet screen.

FIG. 10 is the "Get Items" user interface screen.

FIG. 13 is the "Prepare AIS" user interface screen.

DETAILED DESCRIPTION OF THE PREFERRED EMBODIMENTS

A. Relation between the Test Assembly System (TAS) and the Test Creation System (TCS)

Figure 2:
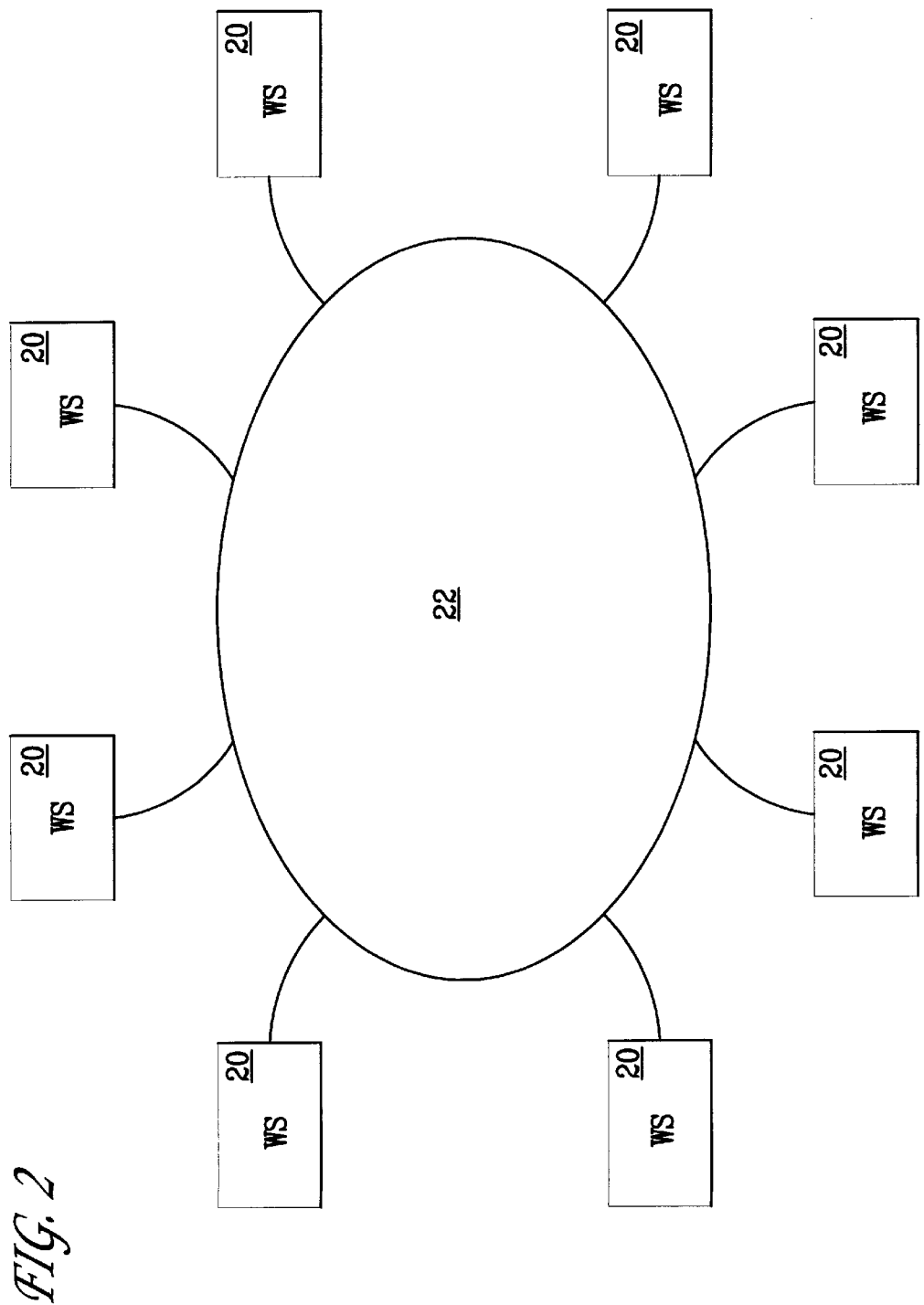
FIG. 2 is a general overview of the TAS (test assembly system) facilities of the invention.

In the drawings, FIG. 2 illustrates a general overview of the test assembly system ("TAS") facilities of the invention. As illustrated, the TAS operates through the use of computer terminals or workstations 20, all electronically connected together via a network 22 through which the TAS is accessed. The primary users of the TAS operate at these workstations 20, such users including: inventory manager or assemblers execute analyses of available items; assemblers select and sequence test items; content specialists perform summative review of assembly; layout personnel format the assembly to required specifications; content experts review the layout; and assemblers or other assembly staff create documentation of the completed assembly. It should be understood, however, that any number of workstations 20 may be used by the TAS.

Figure 3:
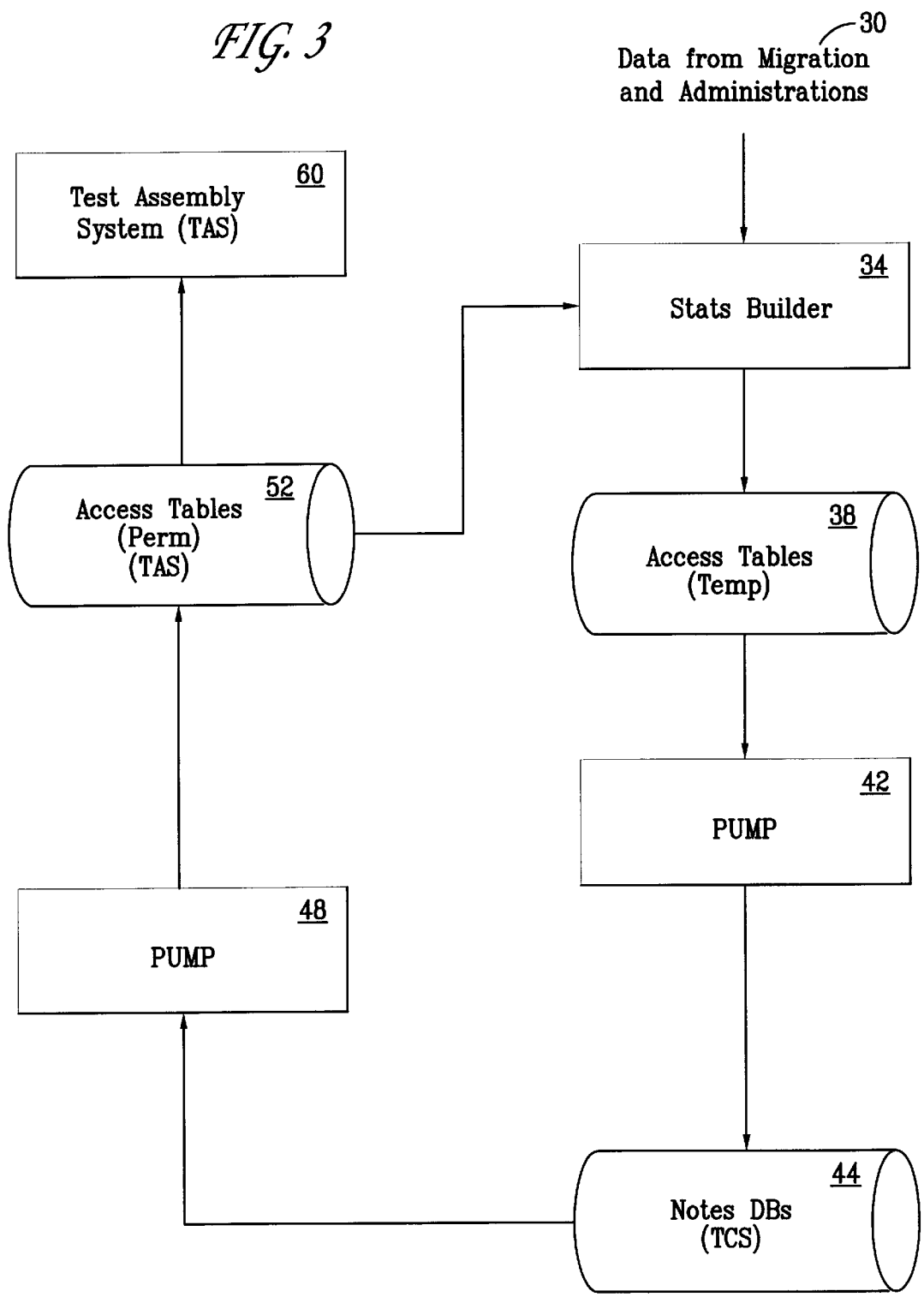
FIG. 3 is a system block diagram depicting the data relationships between the TCS (test creation system) and the TAS of the invention.

A system block diagram depicting the data relationships between the test creation system ("TCS") and the TAS of the invention is shown in FIG. 3. Features of the Test Creation System to which the present invention can be linked are demonstrated in commonly assigned application having Ser. No. 08/826,417, filed on Mar. 27, 1997, entitled "System and Method for Computer Based Test Creation" (Attorney Docket No. ETS-0078), the contents of which are hereby incorporated by reference in their entirety.

FIG. 3 shows data 30 on test items from the prior art TD/DC system (migration) and administrations of test items flowing into a Stats Builder 34, part of a software system used for statistical analysis of tests and test items. From the Stats Builder 34, a data pump 42 moves the statistical information through temporary access tables 38 into the databases 44 of the TCS. The document management software used in the preferred embodiment of the TCS is Lotus Notes™. From Lotus Notes™, information is pumped by data pump 48 into permanent Microsoft™ Access tables 52 which are used by the TAS 60 of the invention. Information in these tables is kept current by frequent replication with the Lotus Notes™ databases 44. The TAS 60 both reads from and writes to the permanent databases 52. Records concerning new tests and statistical information that are related to these tests are added to the data 30 and moved to the Stats Builder 34. From there, the cycle repeats as needed.

B. Test Assembly System (TAS)

Figure 4:
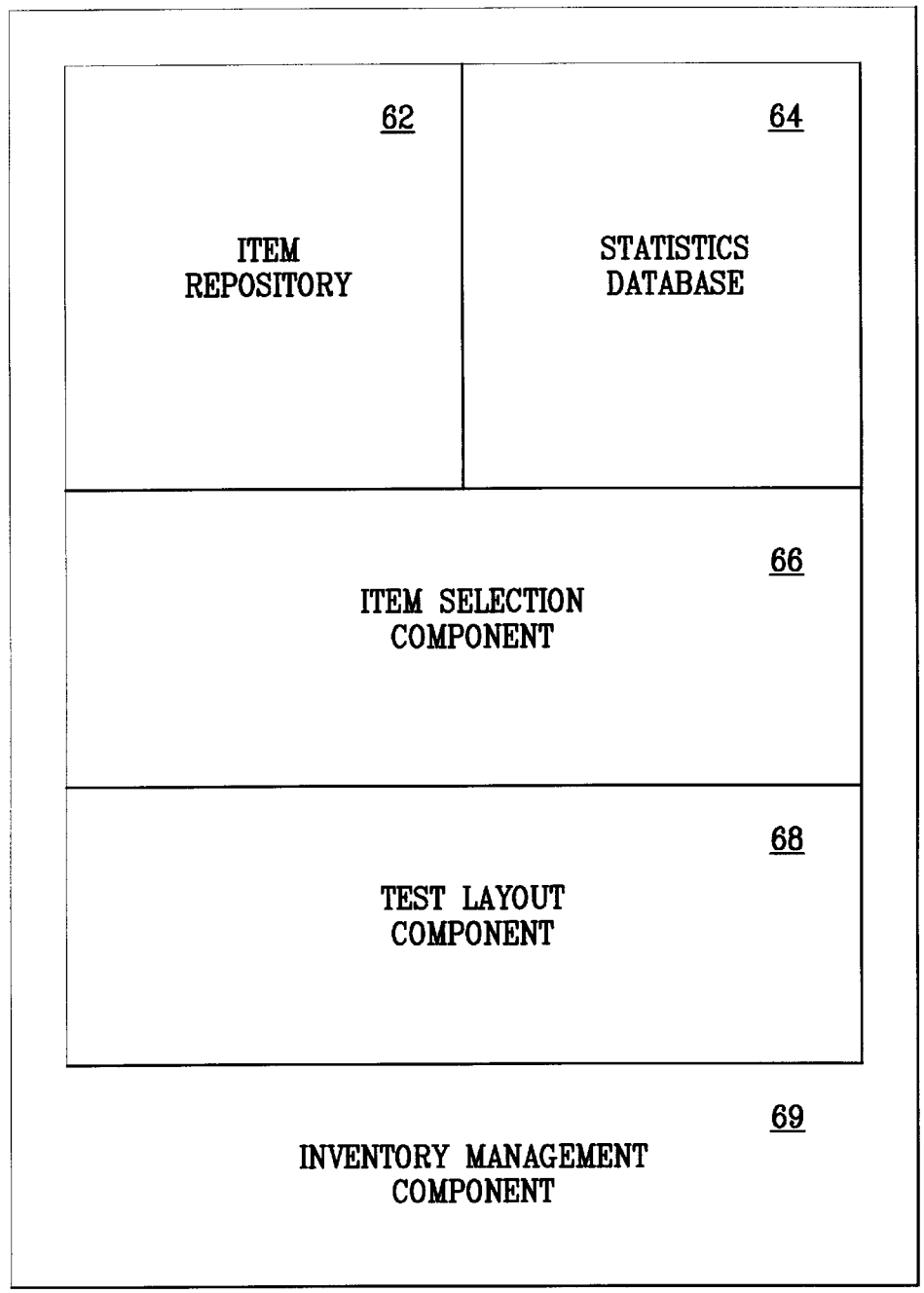
FIG. 4 is a block diagram depicting the interfaces of the major components of the TAS.

A block diagram depicting the interfaces of the major components of the TAS is shown in FIG. 4. As illustrated, the TAS comprises: (1) an item repository 62 for storing available test item information; (2) a statistics database 64 for storing statistical information about available test items; (3) an item selection component 66 for electronically selecting a plurality of test items for storing in a worksheet; (4) a test layout component 68 for producing a test from the selected test items; and (5) an inventory management component 69 for tracking the kinds and quantities of items available for test assembly and for tracking the status of items already assembled into tests.

Figure 5:
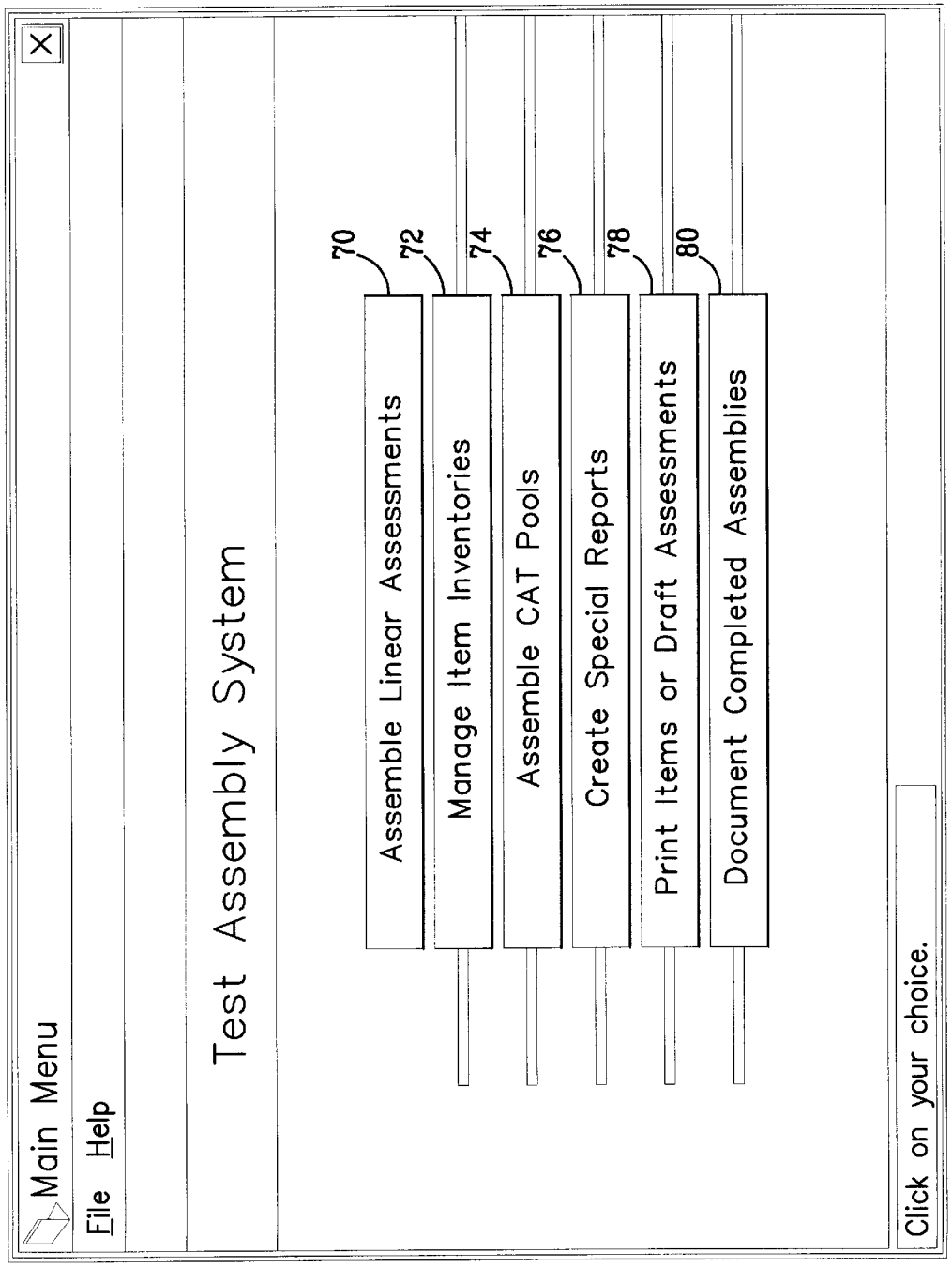
FIG. 5 is the primary menu screen for the TAS.

To demonstrate the mechanics and capabilities of the TAS, a detailed description of the various functions of the TAS follows. When a user logs on to the TAS from his or her workstation, the primary menu screen for the TAS is displayed, as shown in FIG. 5. From the main menu, the user can assemble linear assessments 70, manage item inventories 72, assemble CAT pools (computer adaptive test pools) 74, create special reports 76, print items or draft assessments 78 or document completed assemblies 80.

1. Assemble Linear Assessments

Assembly of linear assessments, the building blocks of the assembly process, takes place within a "worksheet" metaphor. The worksheet is a spreadsheet in which users manipulate item records in order to initiate or complete test assembly functions. Worksheets can be accessed by multiple users within a group. Test Assembly experts use worksheets to aggregate groups of items that will make up a draft test, review draft tests created using automated assembly techniques, aggregate groups of items that will make up a draft CAT pool, review characteristics of groups of items in an inventory of items, and gather groups of items for statistical reports or other reports. The TAS makes use of two kinds of worksheets, "user" worksheets and "form" worksheets. The latter are created automatically by the TAS based on a look up of information in the TCS test forms database. Users of the software have limited rights with regard to form worksheets: they cannot, for example, create or delete them. Form worksheets provide a necessary tie to the TCS by providing a place to hold the final assembled product, complete with its ancillary information (e.g., section number, type of administration, statistics required, etc.). User worksheets, by contrast, are created, renamed, or destroyed at will, and are containers for assemblies in progress, draft CAT pools, snapshots of inventories, etc.

2. Assemble CAT Pools

This function of the TAS will enable users to manipulate data for pools or collections of items for Computer Adaptive Tests (CATs). CATs are adaptive layouts of an assembly of test items as it would appear during an administration of the test to a particular test taker, the appearance of each successive test item being dependent on the manner in which the previous test item was answered. For example, on a given test item, a correct answer by a test taker may lead to a more difficult test item as the next test item, while an incorrect answer may lead to a less difficult test item. The TAS will process item data and prepare files to be fed into existing software applications that simulate the adaptive testing environment and prepare the control parameters that are used to deliver the CAT assessments in the field.

Figure 6:
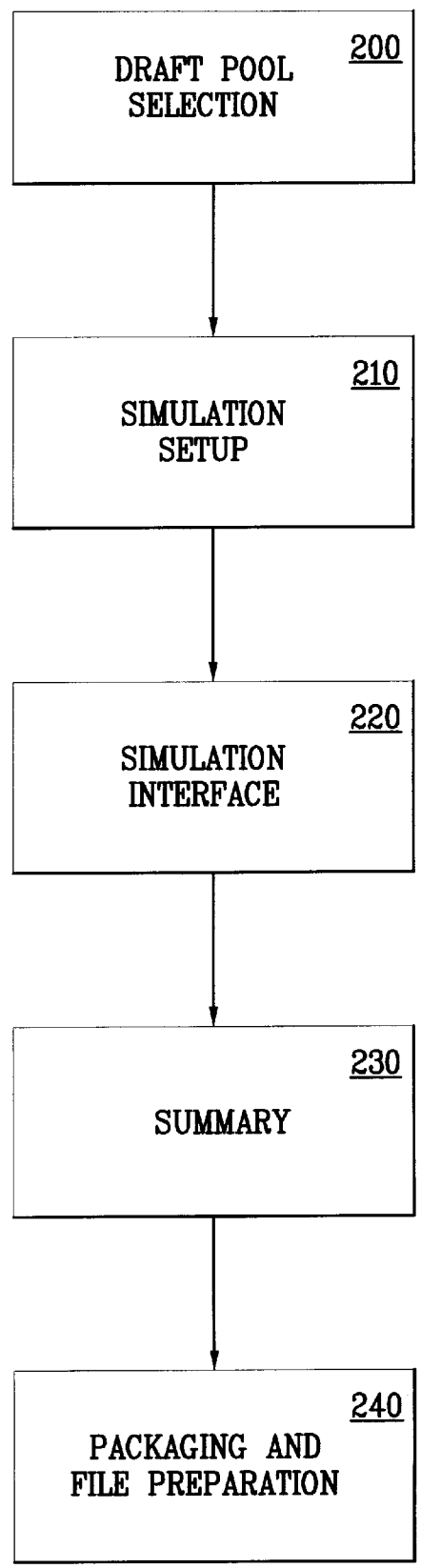
FIG. 6 is a high level system block diagram for a preferred embodiment of the CAT (computer adaptive test) assembly process.

FIG. 6 shows a high level system block diagram for a preferred embodiment of the CAT assembly process. The CAT assembly process takes place in five stages: (1) draft pool selection 200, through the specification of draft pool constraints; (2) simulation setup 210, whereby all necessary input data is collected or created for processing; (3) simulation interface 220, whereby analysis iterations on the draft pool are performed to determine fitness for use; (4) summary 230, whereby evaluation of simulation/analysis runs are performed to determine the optimal CAT pool configuration; and (5) packaging and file preparation 240 of required data for inclusion in a module to be administered by means of a CAT delivery system.

Draft pool selection 200 comprises steps of (a) defining a pool constraint set, (b) specifying parameters for the automated item selection algorithm, described in detail below, to generate a draft pool, (c) defining a CAT item selection constraint set, (d) specifying overlap groups and (e) defining a reference item pool. Simulation setup 210 comprises selecting which files to use for the simulation. Simulation interface 220 comprises selecting and defining the static information and the variable information in the files selected during simulation setup 210, review of inputs and performing the simulations and analyses. Summary 230 comprises summarizing all iterations, summarizing selected iterations in detail and creating sample CATs. Packaging and file preparation 240 comprises preparing files and reports for certification and packaging.

3. Manage Item Inventories

The TAS uses a custom-designed interface to enable users to write query statements for retrieving collections of items into worksheets. This serves as the item selection component of the TAS. The query-writing interface incorporates simple Boolean operators such as "and" and "or" statements, and a parser for structuring the statements. A series of query statements can be saved into "constraint sets" that, with inclusion of appropriate item range and weight information, can be applied simultaneously to generate tests using an automated item selection algorithm, described in detail below. The composition and maintenance of the constraint sets can be accessed directly from any worksheet or directly from the main menu.

4. Create Special Reports

This feature of the TAS enables users to prepare customized reports to meet a variety of needs. A server-based graphics package permits visual representation of item and test-level data from worksheets. Reports are available to track the development of item pools to enable the maintenance of item pools in an "assembly-ready" state. Information is also available on exposure, the number of administrations in which the item has appeared, and difficulty trends for various item types or for items in specific tests or testing programs.

5. Print Items or Draft Assessments

This feature is used to print items individually or as preformatted tests, using the functionality of the automated test layout feature known as the Auto TestLayout ("ATL") process. The Auto TestLayout process is comprised of a series of Microsoft's Word™ macros which pick up documents and item files from a structured set of directories and transform the individual documents into fully-formatted tests.

Figure 7:
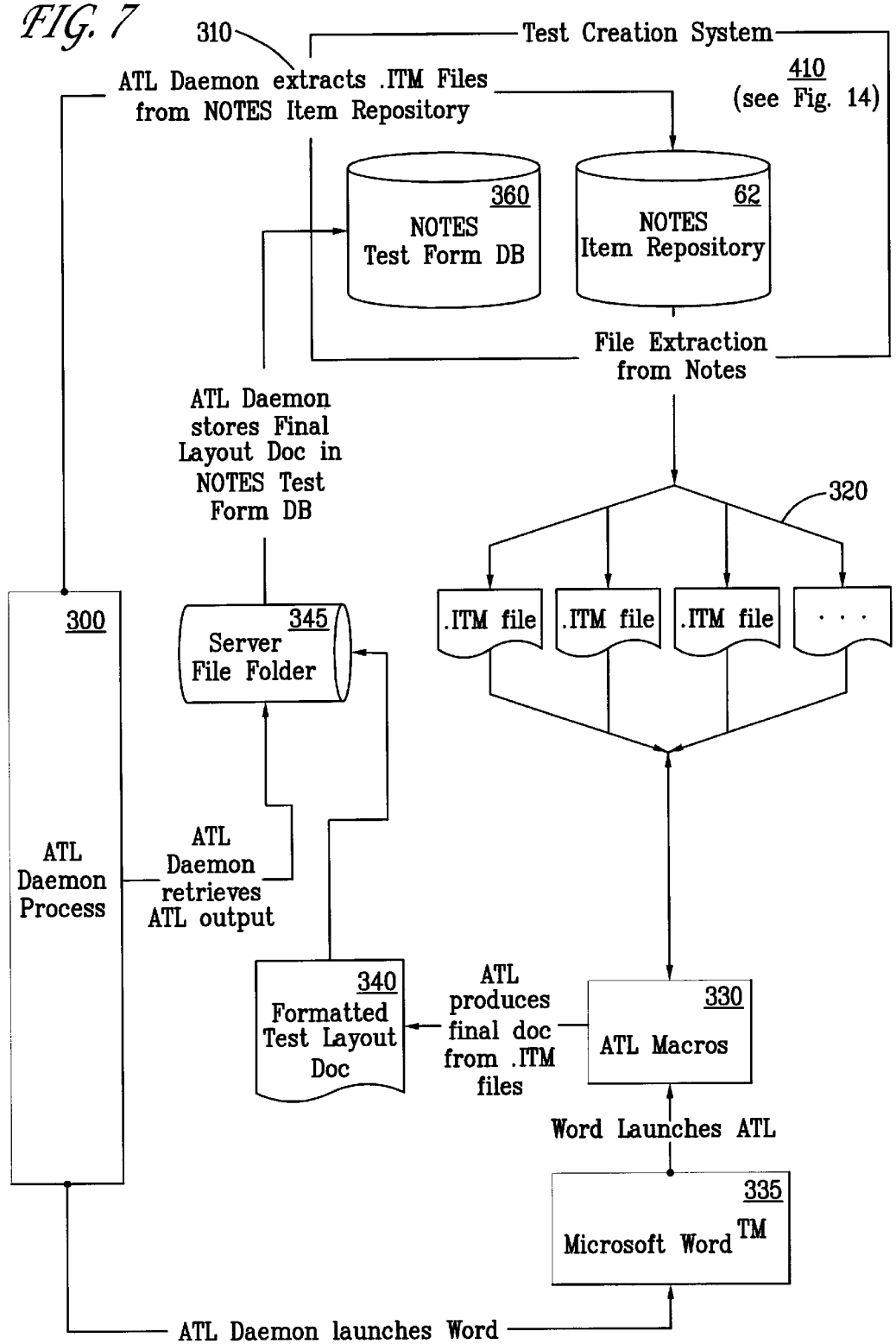
FIG. 7 is a system block diagram of a preferred embodiment of the ATL (Auto TestLayout) process.

The TAS will use these macros to create formatted tests. FIG. 7 shows a system block diagram of a preferred embodiment of the ATL process. Once a test has been approved by a test assembler, the TAS will communicate with a remote server 300 on which the TAS-ATL daemon resides. The daemon 300 will receive the ATL request, extract the relevant Word documents 310 from the relevant item repository 62 in Lotus Notes™, extract the relevant header and section documents 320 for the test in question, and run the Word macros 330 in Microsoft Word™ software 335 on this set of documents to produce a formatted test 340. The macros read the intended sequence of items from the information passed by the TAS main process, look up the necessary set of instructions and other information that goes into the test book from Lotus Notes™, and through a series of successive approximations, place items and instructions on pages in server file folder 345 subject to a variety of constraints, e.g., that an item cannot break across a document, and places it in the relevant Lotus Notes™ database 360, then sends a message back to the TAS main process indicating completion.

6. Publish Certified Assessments or Pools

This feature of the TAS is used to generate permanent records of each assessment or computer based testing pool. These records will be archived in the TCS's test forms database, the user interface screen for which is shown in FIG. 8, which provides information regarding a test form used for a test administration. Records of a completed assembly will include: lists of the items in the test, records of the staff members who completed various tasks associated with the assembly, review and preparation of the test, records of any changes to the test, summaries of statistical characteristics of the test, special files such as score key management files of answer keys ("SKM" key files), and the master copy of the formatted test document file.

C. The TAS Worksheet

The main software tool of the TAS is the worksheet. As mentioned above, the worksheet is a spreadsheet in which users manipulate item records in order to initiate or complete test assembly functions. Test Assembly experts use worksheets to aggregate groups of items that will make up a draft test, review draft tests created using automated assembly techniques, aggregate groups of items that will make up a draft CAT pool, review characteristics of groups of items in a VAT of items, gather groups of items for statistical reports or other reports, and print batches of formatted items for external review.

The TAS worksheeet, shown in FIG. 9, is organized as a table with rows and columns. Each row represents a collection of information about an individual test item, which is identified through its unique accession number 82 in the column labeled "AccNum" 84. Each column contains data that are stored for all items in the TCS and each column heading reflects the data "field" being retrieved into the worksheet.

There are several kinds of information that are captured in a worksheet. Such information includes descriptions of various item types and item content 86, item keys 88, indications of set membership and relationships among elements within a set in the column labeled "SetStatus" 90, e.g., a set leader (just a stimulus) or set member (question item). A set is a set of test items that are interrelated, for example, through the reliance on a common stimulus or set leader. A discrete item 92 is a stand-alone item that is not part of a set.

Other information on a worksheet includes statistical characteristics of each item such as DIF (Differential Item Performance) which shows the performance of the item between different groups, e.g., male/female, IA (Item Analysis) which provides an analysis regarding the number of test takers selecting each possible response and the difficulty of the item, and IRT (Item Response Theory) which provides additional information regarding item performance. Additional information on a worksheet includes information that will support test assembly needs, e.g., history records, exposure data, and flags for items with active problems.

Each new TAS worksheet begins as an empty grid. Items can be brought into a worksheet through one of several methods. Such methods include: (1) copying groups of items from a preexisting worksheet to a target worksheet; (2) using individual query statements to identify groups of items that contain desired properties or characteristics, and moving these items to a target worksheet; and (3) applying one or more queries simultaneously as a "rule set" or "constraint set" to feed information about overall characteristics of a test or test component to the Automated Item Selection algorithm, which will attempt to identify a group of items that simultaneously satisfies these multiple requirements.

Figure 10:
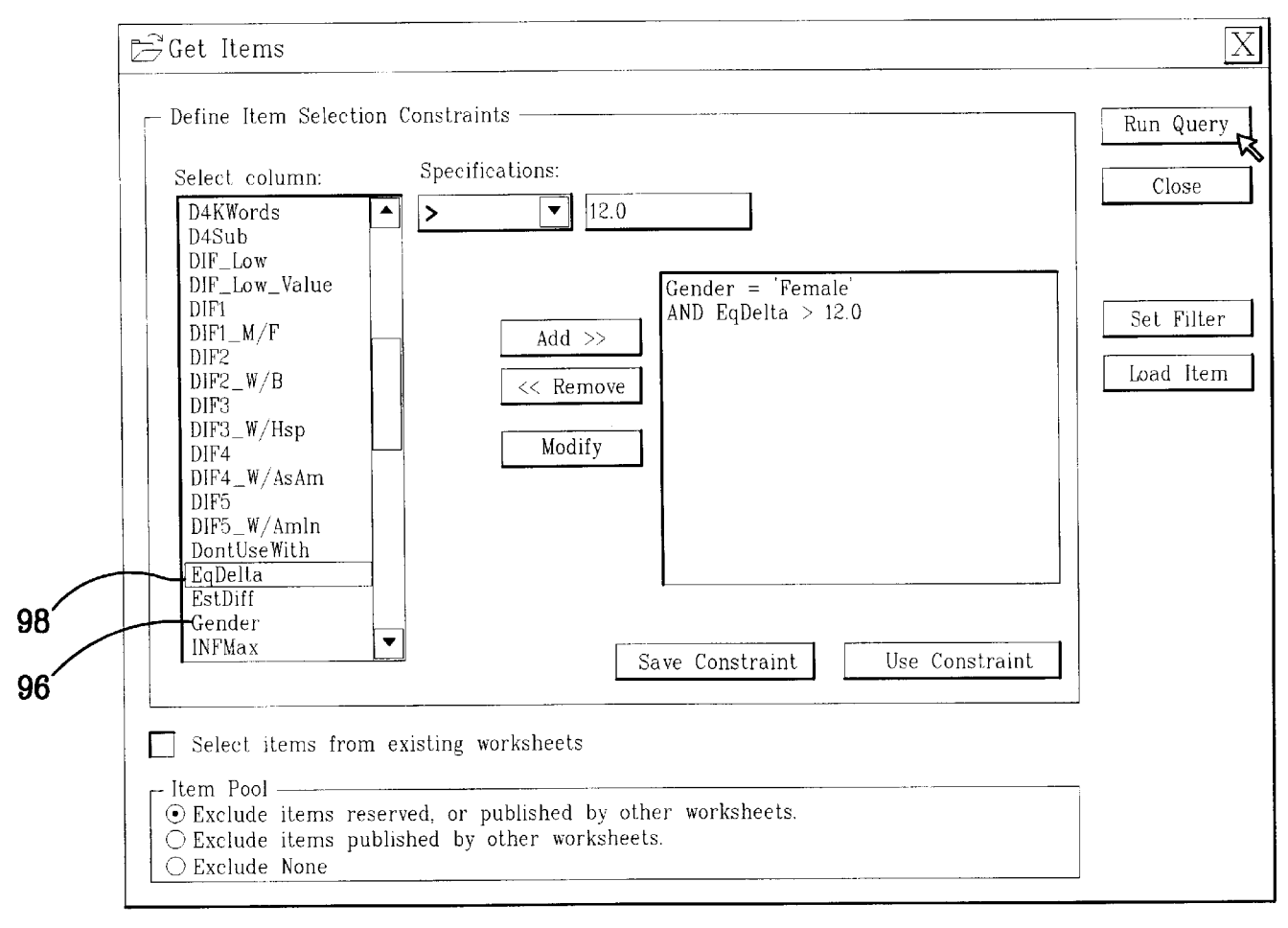

From the Tools 95 selection from the Tool Bar 91 at the top of the worksheet screen of FIG. 9, a user can select a "Get Items" option. This option takes the user to the query/rule screens, of which a "Get Items" user interface screen is shown in FIG. 10. Get Items enables the user to run a single query and then dump all found items to a temporary worksheet. From there, users can select which items to use in their target worksheet. New discrete items that meet the query will be displayed at the top of the worksheet. New sets of items will be displayed at the bottom of the worksheet. In FIG. 10, the "Get Items" screen has been formulated to retrieve all items where the gender 96 of the item is female and a statistic for item difficulty, EqDelta 98, is greater than 12.0.

Figure 11:
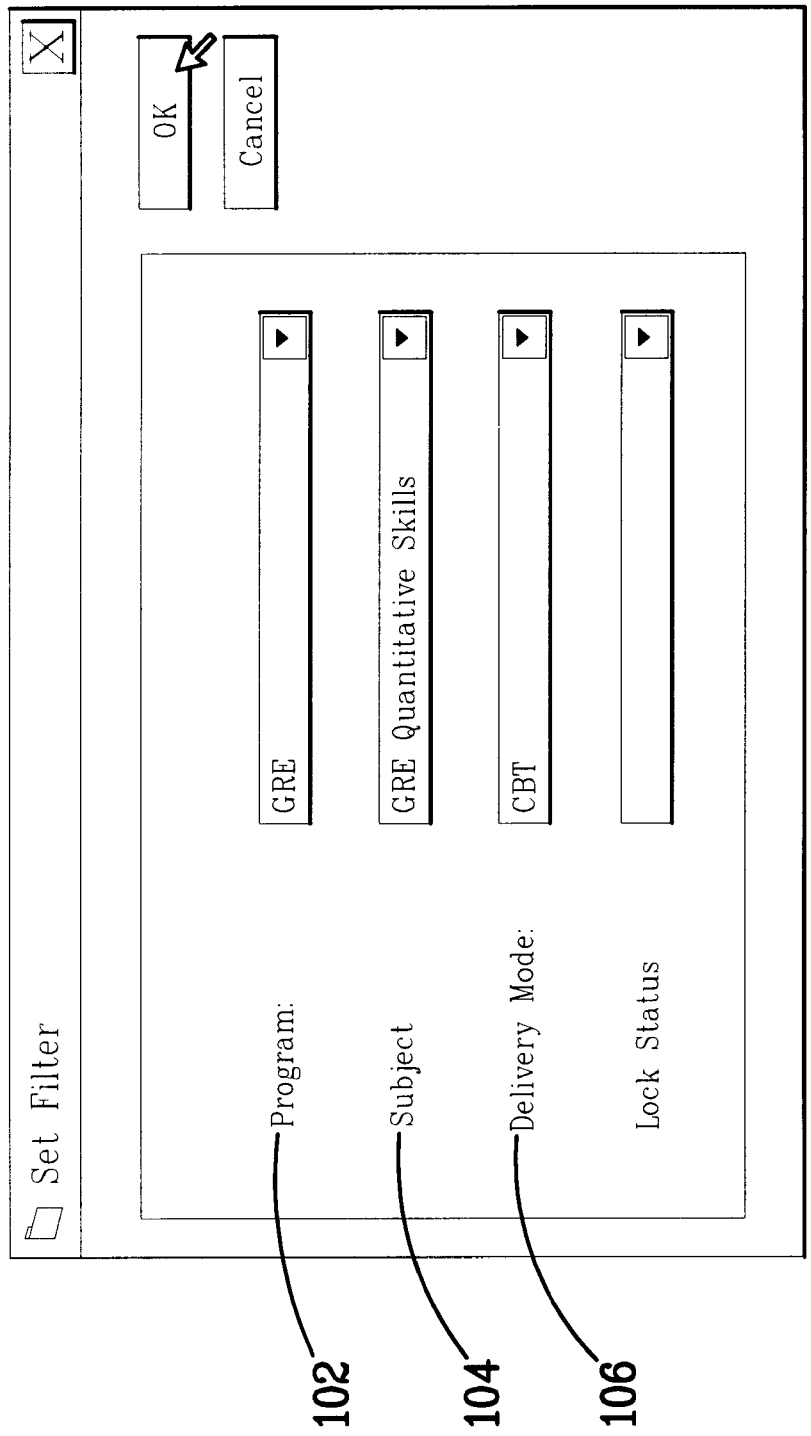
FIG. 11 is the "Set Filter" user interface screen.

FIG. 11 shows a "Set Filter" user interface screen. With this function, users can formulate and save "filter" statements with sets of queries. The filter statement automatically preappends additional criteria such as program 102, subject 104 and delivery mode 106 to any query in a set.

Figure 12A:
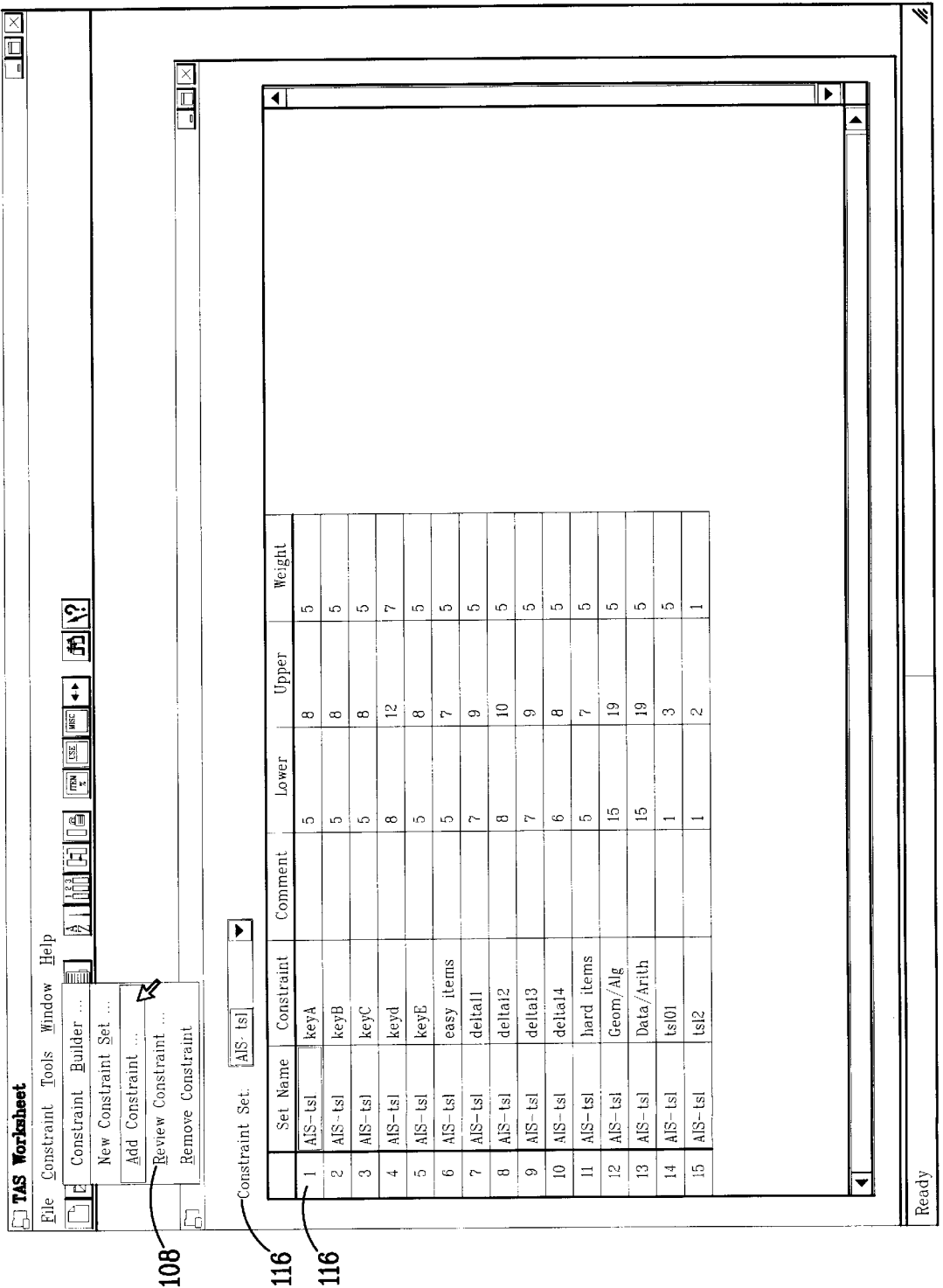
FIG. 12A is the "Constraint/Set" user interface screen.

From the Tools 95 selection from the Tool Bar 91 at the top of the worksheet screen of FIG. 9, a user can select a "Constraint/Set" option. The "Constraint/Set" user interface screen is shown in FIG. 12A. This tool enables a user to build, store and manipulate collections of constraints or constraint sets 116. Constraints can be used in sets to invoke the Automated Item Selection ("AIS") Process, or a user can use the Review Constraint 108 feature to run or modify individual queries based on a selected saved constraint statement.

Figure 12B:
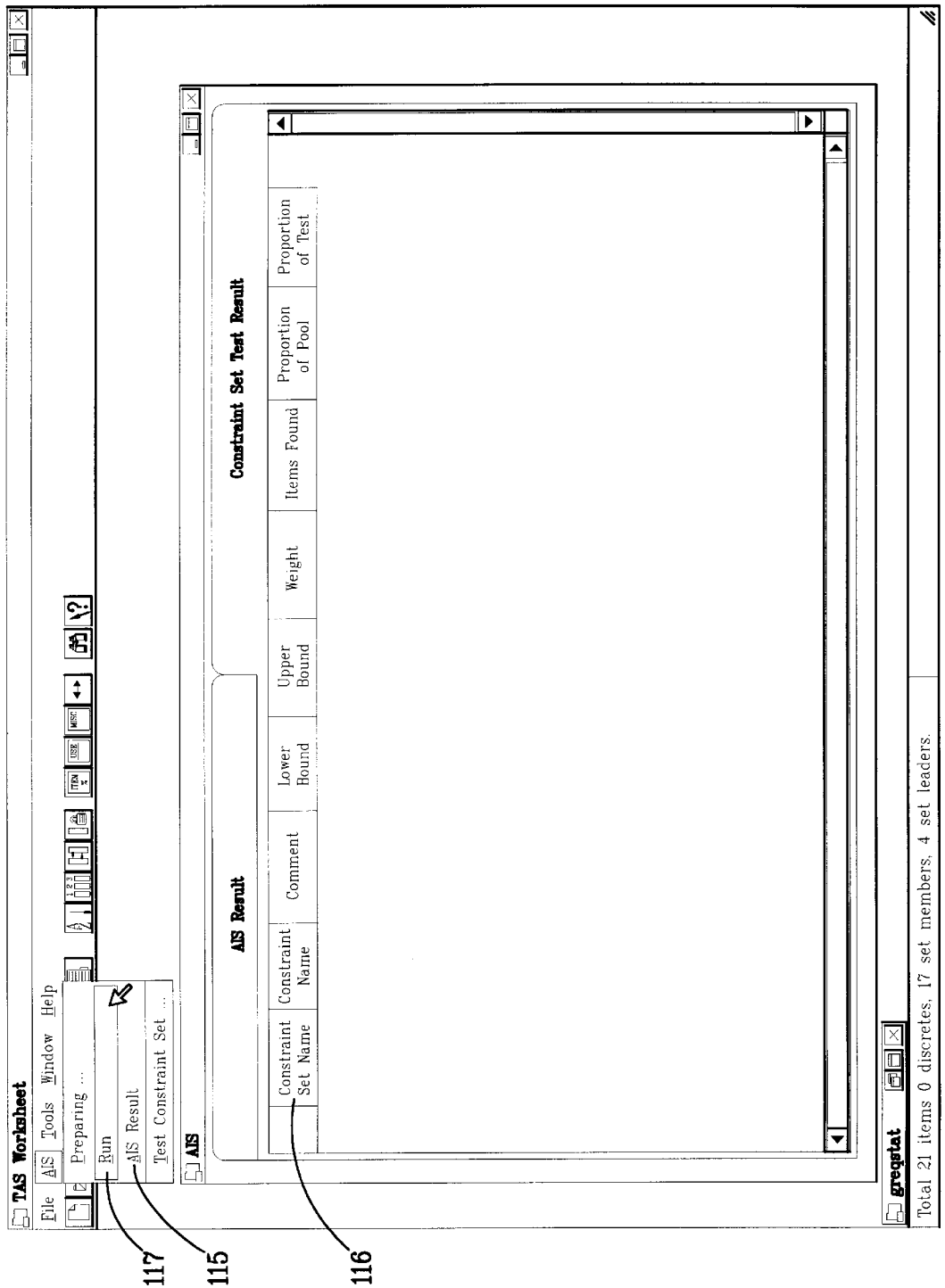
FIG. 12B is the "AIS" user interface screen.

From the Tools 95 selection from the Tool Bar 91 at the top of the worksheet screen of FIG. 9, a user can also select an "AIS" option. The "AIS" user interface screen is shown in FIG. 12B. This screen displays information on each constraint set 116 and the results 115 of an AIS run 117.

The "Prepare AIS" user interface screen is shown in FIG. 13. The AIS feature enables users to easily prepare information for automated selection of sets of test items that meet predefined characteristics. Using AIS and carefully-constructed constraint sets 116, a user can simultaneously construct up to 32 tests 114 with comparable characteristics.

The TAS prepares information files that report both on the assembly specification of the test and also on which items satisfy each constraint in a set. Sophisticated statistical and other targets can also be specified for matching by the AIS algorithm. Results of AIS processing are displayed in summary tables for the user's analysis and can be automatically placed into one or more new worksheets.

D. The Method of Assembling a Test using the TAS

The building blocks of the assembly process of the present invention are linear assessments created for operational test editions, pretesting, item-tryout, or any other set of items in a fixed linear sequence. As known to those skilled in the art, item tryout is a sub-category of pretesting that is conducted non-operationally on small numbers of students, producing statistics that are not considered reliable enough for reporting scores but are helpful for assembly and for revising items. The assembly process also works with paper-and-pencil testing (PPT) as well as computer-based testing (CBT). The process of assembly and layout of fixed linear assessments starts with complete test items and ends with camera-ready test-booklet copy as well as the necessary item, test, and scoring information records. An objective of this process is to assemble valid tests quickly and efficiently.

The assembly and layout process has four major segments: (1) planning for the test; (2) selecting and sequencing the items; (3) laying out the test pages (not applicable to computer-based tests); and (4) putting together all parts of the booklets or CBT packages and submitting the test and scoring information. Much of the savings in time and cost for the test assembly and layout process will result because the items are already reviewed and formatted. Many aspects of current reviews, typically done in the process, will now be done in the TCS. Reviews of assembled tests in the new process will concentrate on the collection of items rather than on the individual items.

The assembly process utilizes Automated Item Selection (AIS) and item repository searches to facilitate item selection. Many test developers today assemble tests without using AIS or any other kind of electronic searching on the basis of item classifications. Given the move in the direction of computer-based tests (CBTs), the process of the invention has been designed to take advantage of as much electronic assembly as possible. Unlike test item writing, which computers cannot do very well at this point, test assembly lends itself to electronic help. Thus, it is critical to translate as much information on the test items as possible, e.g., item classifications and AIS constraints, into electronic information that assemblers consider when they assemble tests. This computer help will provide more time for the assembly staff to concentrate their efforts in those areas a computer cannot address.

The process of assembly and layout of fixed linear assessments is supported by the TAS and the TCS. The tools in this software will make possible the efficient selection, sequencing, and evaluation of groups of test items. The TAS integrates the following functions:

inventory management-to assess an item inventory quickly and accurately;
creation and maintenance of constraints and queries for use with AIS;
automated item selection processes-for running AIS and selecting test items;
worksheet creation and manipulation-for creating and changing collections of items;
reporting features to enable the review of assemblies for the quick generation of the reports one needs to evaluate the collection and sequencing of test items;
page layout functions to enable the layout work for linear tests;
archiving and history features to document an assembly at the item and test levels to do necessary record keeping and off-loading; and
item and test level security enforced by a group security model and the use of remote processes (e.g., ATL) where required.

Test assembly will no longer be the stage where refinement of items takes place. Stringent item review will be concentrated in the item review stages in the TCS, and test assembly will be largely a process of ensuring that specifications have been met and controlling for overlap.

Much of what is reviewed in the current assembly process such as "test specialist," "edit," "sensitivity," "coordinator," and "piano" reviews will, in the new process, be completed during the item writing and reviewing stage of the TCS and thus will not have to be repeated during the assembly stage. The "plano" is a copy of the items sequenced in the order in which they are going to appear in the test booklet and some general information about what is to be printed. Assembly reviews of tests will focus on balance, cueing, sequencing issues, and the layout of the items on test booklet pages.

1. Software Tools

The TAS includes six software components that support the assembly and layout of fixed linear assessments:

(1) Worksheet Creation and Management;
(2) Report Generator;
(3) Constraint and Query Management;
(4) Layout Macros and Tools;
(5) Archiving and Creation of Item and Test Records; and
(6) CAT Simulations Input Management.

The TAS also includes, among other features, facilities to generate graphical displays of item statistics and graphical representation of special reports, and a graphical item inventory viewer.

2. High Level Workflow Description

Before beginning the assembly process, it is determined that (1) there is inventory of "locked" items, i.e., test items that are ready for assembly and administration; (2) the locked items are classified; and (3) the inventory of items is rich enough to produce a test that meets the desired specifications.

The selection and sequencing of items starts the assembly process and includes the steps of: (1) selecting test items using AIS and/or queries; (2) sequencing test items in an appropriate order; and (3) signing off on test items by a content expert, confirming that the test meets the specifications and has no sequencing or overlap problems. This third step is referred to as "summative review."

For paper-and-pencil (PPT) tests, the process of layout of test pages and archiving of item/test records includes: (1) laying out the test items on test pages by a layout specialist using layout macros; (2) signing off on the test by a content expert, confirming that the layout of the items on the test pages is correct; and (3) attaching the test pages to the test form record in the test forms database, and creating item, test, and subscore information records. The second step is referred to as "layout review." A script, cassette, and other accompanying media for the test is then created, as well as a master tape, if necessary. A script is merely the script of an audio cassette, e.g., in a test for a foreign language.

For CBT tests, the approved pretest worksheet is off-loaded for packaging. For PPT tests, "packaging" of complete test booklets with covers, directions, spirals, etc. involves a content expert approving the test pages, a layout specialist combining the test pages with the covers, generic directions, other sections, etc., to complete the test package. The test creation team that oversees assembly, or the test coordinator, signs off that the package is correct. Mechanicals (paper or electronic copy) are then sent to publications. Publications or the test creation team then sends a copy called the plano to the printer. The plano is a copy of the items with the order in which they are going to appear in the test booklet and some general information about what is to be printed.

For all tests, scoring information, test form information, and item history records are stored in Lotus Notes™, thereby providing a centralized respository of information from which the appropriate analysis group or the office of test keys can retrieve it. For PPT tests, bluelines, the initial test booklet which comes back from the printer, is checked by the staff who sent the mechanicals to the printer. It is approved and then the printer is given the "go-ahead" to print all of the desired number of copies.

3. Underlying Improvements

Various improvements in the test assembly process are present in the TAS by means of the building blocks and the information fed into the TAS. The classification system, designed to provide the information needed by assemblers to assemble a test electronically and which starts during item creation in the TCS, provides many improvements. Each subject area will have its own common set of classifications for all items and tests, some subjects requiring two or more classification schemes to cover the tests in their areas.

The TCS yields inventories of locked items which will already be fully classified, fully formatted, and fully reviewed prior to beginning the assembly process. As a result of this improvement, the assembly process becomes much quicker, with much less chance of introducing errors. In addition, an electronic record of the test specifications for each test is stored in the TAS, so that the test assembly in progress may be compared to the specifications electronically.

4. Details on the TAS Process a. Planning for a Test and Obtaining Various Code Numbers Each test form or section is planned during the yearly planning cycle, as is currently the case. The test creation team or test coordinators set the administration schedule, delivery dates, and productions dates. Production milestones will include content approval of item selection and sequence, content approval of layout for PPT only, test creation team approval of the "package" (cover, sections, sub-forms, etc.), and mechanicals to Publications or off-load to CBT Packaging, and test form report to analysis. After the decision is made to assemble a test, a member of the test creation team fills out a Test Ordering, Scheduling & Tracking ("TOST") order. TOST is a monitoring system where a test order is entered and monitored until the test booklets get back from publishing. TOST will be replaced with a new Test Creation Planning database in Lotus Notes™, with which the TAS will communicate directly to get information bout what tests need to be assembled, by whom, and by when.

The test creation team is responsible for requesting the necessary test codes, form codes, stock numbers, or book codes for each test. For PPT tests, the test creation team is also responsible for creating or confirming all the covers and generic program directions for each test booklet based on the templates stored in the TCS. These covers and generic directions are combined with the approved test pages after content experts have signed off that all the items are correctly laid out on the test pages.

Test creation teams that produce PPTs will have a layout specialist responsible for creating the covers with the content and program specialists. If the program does not have a test creation team, there will be a layout specialist assigned to the program to work with a test coordinator to create the covers and directions. This specialization by program by layout specialists (and other publishing specialists) is intended to facilitate better and more efficient work through familiarity with a program, closer working relationships among staff who work on the same tests, and more control over decision-making and scheduling for those who work on the publishing end of the test creation work.

Information on a test such as population characteristics, estimated number of examinees, sampling constraints, item analysis dates, administration dates, item and score equating and scale information, type of scoring, and test/section purpose are included in the planning documents so it does not have to be repeated on a report on each assembly.

b. Inventory Management

As part of planning for new assessments, the inventory manager, who keeps track of items during creation in the TCS, monitors the contents of the item inventories. The inventory manager diagnoses with reasonable accuracy whether the inventory can support the forecasted number of assemblies. If not, specific item needs will be negotiated with content groups, or strategies for coping with the shortages, e.g., delaying development of one form can be developed by the test creation team.

C. Creating a Draft Test or Section

A member of the test creation team or a test coordinator or coordinator's assistant creates and defines a new entry in the TCS test forms database and fills in the needed basic information. When an assembler launches the TAS, the TAS reads this entry and creates a new 'test form worksheet' into which a final assembled collection of items can be placed. Prior to making use of the form worksheet, an assembler will typically create (and perhaps delete) some number of 'user-defined' worksheets. These 'user' worksheets provide a workspace for the assembler, while the 'form' worksheets constitute the storage space for the assembled product. The assembler calls up the blank worksheet when he/she is ready to begin selecting items. The assembler is the staff member in charge of using AIS and queries to build a draft test. The assembler may be a content expert, depending on the level of refinement of the AIS constraint set. The less refined the constraint set, the more content expertise is needed by the assembler. The assembler will usually be a member of the test creation team, but for some subject tests without a representative on the team, the assembler will be a non-test creation team member from a content group.

The assembler uses AIS, a combination of AIS and queries, or queries alone to construct a draft test. The details on item selection are provided below. The assembler can use the reporting tools at any time to assess the draft test or partial test. These reports can list what overlap in keywords has occurred and also how well the draft test meets the content, race, sex, and statistical specifications. The assembler replaces items, with the aid of a content expert when necessary, and re-runs the reports until a satisfactory collection of items is generated.

The assembler now sequences the items in an appropriate order. Due to numerous variations between the needs of specific subject areas and programs, fully automated sequencing of items is not available in the TAS. However, multi-level sorting is available, e.g., by specification and then by increasing EqDelta, a statistic for item difficulty, within the specification, which permits the assembler to quickly generate a desired sequence. It is also relatively simple to make modifications to the requested sequence.

d. Approving the Collection and Sequence of Items

A content expert now performs a "summative review" of the assembly. The content expert may be a member of the test creation team. For an in-house or internal summative review, a content reviewer performs a review of the selected worksheet. The reporting tools enable the reviewer to verify that the specifications have been met and to browse each item in its locked, camera-ready format. This review is most quickly done on-line, but the materials can also be printed to paper copies. The reviewer's sign-off is a confirmation that:

> the test meets the content, race, sex, item type, and statistical specifications (or reasons for not meeting them are noted and accepted in the worksheet). The TAS can also generate a report to show how the test compares to specifications; the test agrees with the equating plans, including, if applicable, equater position, difficulty scale distribution, etc. For example, the equating plan specifies which collections of items from previous administrations will be used in a given test to allow the statistical characteristics of the new items to be equated to these previous administrations.
> The TAS can also generate a report to show how the equating block compares to equating specifications;
> there is no unacceptable overlap among test items;
> there is no unacceptable cueing among items; and there are no sensitivity, problems from a holistic perspective.

If the assembly is not acceptable, the reviewer works with the assembler until the assembly is acceptable and the reviewer can sign off. The reviewer, like the assembler, does not typically print out any reports.

If review by a committee or other outside experts is required, the assembler may need to print out the test. There is a Quick-Draft option in the TAS by which a user can print out representations of the items in sequence order, with a user-defined header and footer containing classification or statistical information about the printed items. Assemblers also have the option of printing the items one-per-page if item information such as key, classifications, accession number, or item type is needed. Again, if the assembly is not acceptable, the assembly staff member works with the outside reviewers until the assembly is acceptable and the reviewer can sign off.

Programs that are restricted to fit into a limited number of pages will want to run a draft test at this point to make sure that the items will fit into the prerequisite space. If additional space is needed, content experts can advise how to replace some of the longer items with shorter ones.

In some cases, for tests with very small inventory of items, there will be the possibility of unlocking items and making minor changes to avoid problematic overlap or cueing. These items will go through an abbreviated item review process before being put into a test.

For tests with test scripts and cassettes, the work on the master tape should begin after item selection and sequence are approved.

e. Layout of the Test Pages for Paper-and-pencil Tests

For all PPT tests, after the item selection and sequence are approved, the test or section is ready for final layout. The TAS runs a sequence of layout macros (See FIGS. 7 and 14). These macros are a set of commands that tell the system to go into the official record of each item and import the locked, camera-ready version into its sequenced place on the test page.

The layout specialist then performs any necessary manual work to produce suitable layout on the draft formatted test pages. Details such as header material, page numbers, and "go-ons," are stored in the original template and created for the test during the initial implementation stages. Most of the adjustments at this time should be small such as adjustments to white space, "go-ons," centering, and insertion of separation lines. There may also be some manual insertions of photographs for stimuli if the scanning technology and/or copyright constraints do not allow for use of scanned copies of photographs.

f. Approval of the Test Pages

A content expert approves the layout. The content expert may be a member of the test creation team, depending on the representation of expertise available on the team. If the layout is not acceptable, the content expert works with the layout specialist until an acceptable layout is achieved. The test pages are now approved and ready to be "packaged" with the covers and other sections.

g. Creating an Off-load to go to Packaging for Computer-based Tests

The approved pretest worksheet of a CBT pretest is off-loaded for packaging through Lotus Notes™. An 'agent' in Lotus Notes™ reads the test information provided by the TAS from the relevant test forms record, and bundles all of the various CBT component files (the five to eight files that comprise an individual CBT item) for the collection of items in the worksheet.

h. Archiving of Test and Item Records

At the time of content approval of layout or CBT off-load, the following files are produced and placed in the test forms database of the TCS for the current test form:

> the electronic file of the camera-ready test pages (for PPT tests)
> a report of worksheet contents with any notes about exceptions to specifications or equating plan;
> a record of any changes to items;
> a record of necessary subscore information, i.e., any collection of items on which a score may be -continued > calculated; and
> SKM key files for the assembled test.

Additionally, history records are automatically generated for the test form and for each item. Statistical information for the current test form is blank until data are received from Analysis, part of the TCS which follows administration of test items.

For tests with cassettes, the master tape should also be approved at this time.

i. Producing the Finished Test Booklets for Paper-and-pencil Tests

The test creation team is responsible for seeing that the entire "package" is collected and laid out correctly. A package may be any of the following:

> a test with its covers, e.g., a subject test;
> a multi-section test with operational and pretest sections with its cover e.g., a skills test;
> a spiral or multiple spirals of a multi-section test with their covers, e.g., a large skills test; and
> a book of tests, e.g., SAT 11.

The layout specialist uses the preexisting templates to generate the covers and puts them together with the test pages from the test forms database. An expert on the test creation team or some combination of authorized persons approves the packages.

j. Generating the Mechanicals and Necessary Reports

The camera-ready copy of each PPT package is then sent to Publications in either electronic or paper form. The test creation team then generates the following reports to send to Analysis and the office of test keys:

> Subscore lists, if necessary;
> Test information; and
> SKM key file off-load(s).

k. Inventory Analysis

The inventory manager analyzes the available contents of the item inventory and determines what types of items must be generated to satisfy future planned test assemblies.

1. Bluelines

Bluelines are checked by the staff who sent the mechanicals to the printer, i.e., either the test creation team or Publications. Bluelines are the initial test booklets which come back from the printer. After approval, the printer is given the "go-ahead" to print all of the desired number of copies.

E. Details on the Item Selection Process

1. Background

Automated Item Selection, or AIS, is a relatively quick way to assemble a test that meets test specifications, since it simultaneously tries to satisfy all codified assembly considerations at one time. Once a collection of constraints is refined to the point where it produces good tests or sections almost every time, it takes only a few minutes to set up a worksheet and ask AIS to construct one or more new tests or sections.

AIS is most effective when there are enough assemblies per year to justify the up-front time and repeated trials required to refine the set of constraints to produce a good collection of items on the first or second try. Additionally, AIS is most effective when there is a relatively large inventory of items, so that the AIS algorithm can satisfy all the requirements expressed in the constraints by making trade-offs among a number of items. Generally, AIS has the biggest payoff for large skills tests or tests with multiple assemblies each year.

Although it may not be cost-effective in the short term to refine a set of AIS constraints for the assembly of subject tests or other tests assembled once or twice a year from a relatively small inventory of items, the assembly process can nonetheless be streamlined by creating a constraint set that matches test specifications. This allows the assembler to quickly evaluate a draft test vis-a-vis the test specifications, in most cases through a combination of AIS and item-by-item or group-by-group queries. Greater efficiencies can be achieved by developing an inventory-building strategy that will build stronger inventories over time.

One option for relatively infrequent assembly might be to build a relatively crude set of AIS constraints that would produce a rough draft test, which a content expert could then assess and modify as needed. Another approach would be to use AIS rules to build certain sections of the test, like the equating block, and then to construct the rest of the test around it. This would enable a building-in-stages approach to test assembly, a logical way to build PPTs and one that many test developers use today.

The reporting tools in the TAS would allow an assembler to run reports at any time to guide the next stage of the assembly. These reports can show, for example, the extent of keyword overlap or how the draft collection matches the test's content, fairness, or statistical specifications.

There are several other options for using a combination of AIS and queries in the TAS. As each test makes the transition to the new TAS and software, a specialist in test assembly will help staff who work on the test decide on the best approach for each particular test.

2. Item Classifications

The new item classification structure for use by the TAS provides the opportunity to store a good deal of information about each item. When designing classifications for new items, content experts will be questioned on the important characteristics of the items in considering them for putting together a balanced test. All sorts of item characteristics can be captured, including content and cognitive characteristics and information about stimuli.

The classification structure allows content experts to use three "content dimensions," each with a main level, secondary level, and a "fixed keyword" level. The "fixed keyword" level allows content staff to track frequently used names, places, examples, or words so that overlap can be controlled electronically during test assembly.

The following are two examples of how music items for AP, GRE, Praxis, and NAEP tests in music might be classified.

Ex. 1: The opening and closing movements of a Vivaldi concerto would most likely be in which of the following forms?

(A) Sonata
(B) Ritomello
(C) Binary
(D) Rounded binary
(E) Through-composed

```
Dimension I
    Music History
        Baroque
            Italy
Dimension 2
    Form
        Instrumental - orchestral
            Vivaldi
Dimension 3
    Identification
        Neither (i.e., no visual or aural stimulus)
            None (i.e., no stimulus type)
```

Ex. 2: Which of the following accurately describes the relationship between the note values in measure 23 and those in measure 24?

(A) An eighth note in measure 23 is equal to a quarter note in measure 24.

(B) The value of an eighth note is the same in both measures.

(C) A dotted half note in measure 23 is equal to a half note in measure 24.

(D) A quarter note in measure 23 is equal to a dotted quarter note in measure 24.

(E) The three half notes in measure 23 are equal to the two half notes in measure 24.

```
Dimension I
    Music Theory
        Romantic
            German
Dimension 2
    Rhythm/Meter
        Instrumental - solo
            Brahms
Dimension 3
    Score analysis
        Visual only
            Score
```

3. Automated Item Selection (AIS)

AIS refers to both a process and to an instantiation of that process in software. In the AIS process, the user develops a set of constraints. Each constraint includes the characteristics of items needed, the number of items with these characteristics that should be included in the test specified by a "lower bound" and an "upper bound", and the "weight" of each constraint versus other constraints. The weight conveys to AIS that certain constraints are more essential than others to satisfy.

When a user calls up his/her set of constraints and starts the algorithm working, the TAS scans all the available items and generates information regarding which constraints are satisfied by each item. The AIS algorithm evaluates this information and attempts to identify a collection of items that simultaneously satisfy all the requirements. This information is passed back to the TAS, which displays the selected items in a new worksheet.

4. Constraints

A constraint is a command that tells the AIS algorithm to find a certain number of items, specified by a lower bound and an upper bound, with certain content classifications, statistics, and/or other characteristics. Some constraints will focus on item content, which, for the above examples could be:

2–3 items on music theory;
2–3 items on music history;
3–4 items on Romantic music; and
3–4 items on Classical music.

Constraints are not necessarily mutually exclusive in that a single item might satisfy two constraints. A question about the rhythmic features in a Classical piece of music, for example, would satisfy both the first and fourth constraints above.

Other constraints will focus on item statistics, such as:

8–9 items with an EqDelta between 12.0 and 13.0; and
6–7 items with an EqDelta between 11.0 and 12.0.

AIS will have to consider these statistical constraints in the context of considering the content constraints and see if it can come up with a set of items that satisfies all the constraints.

Constraints can also be linked with boolean operators such as "and" and "or." An example of a combination of constraints is:

3–4 items with an EqDelta between 11.0 and 11.5 and gender "female."

In addition to the bounds associated with each constraint, there is also a weight reflecting the relative importance of the constraint. The higher the number in the weight column, the more the AIS algorithm will strive to satisfy this constraint over those with lower weights. Systematic try-out of constraint sets is driven by content experts' prioritization of the importance of each constraint. A trial-and-error process, however, is often needed to set the actual values for the bounds and weights on each constraint to determine a workable combination.

5. Queries

A query, like a constraint, is a search command that asks the computer to find items with specified characteristics. With a query, however, the user asks the computer to find all items that meet the constructed profile. One does not ask for a certain number of these items, nor is the search weighted as one would weight a constraint. Individual queries are not used with AIS. Each query is run as a separate search of the database of items.

Some examples of queries include:

Find all items classified Baroque;
Find all items classified Fugue-With Visual Stimulus;
Find all items with an EqDelta of 16.0 or higher; and
Find all items that are Constructed-Response-Harmony.

When a user runs a query, the TAS responds with how many items were found that satisfy the request. One can either refine the query or choose to have all the items added to a temporary worksheet. The items in this temporary worksheet may be sorted by viewing the text of the items at the bottom of the screen by selecting a "Browse feature," so one does not have to print the items to view them. From here, one can copy or move the viable items into an active worksheet.

F. Flow Diagram of the TAS.

Figure 14:
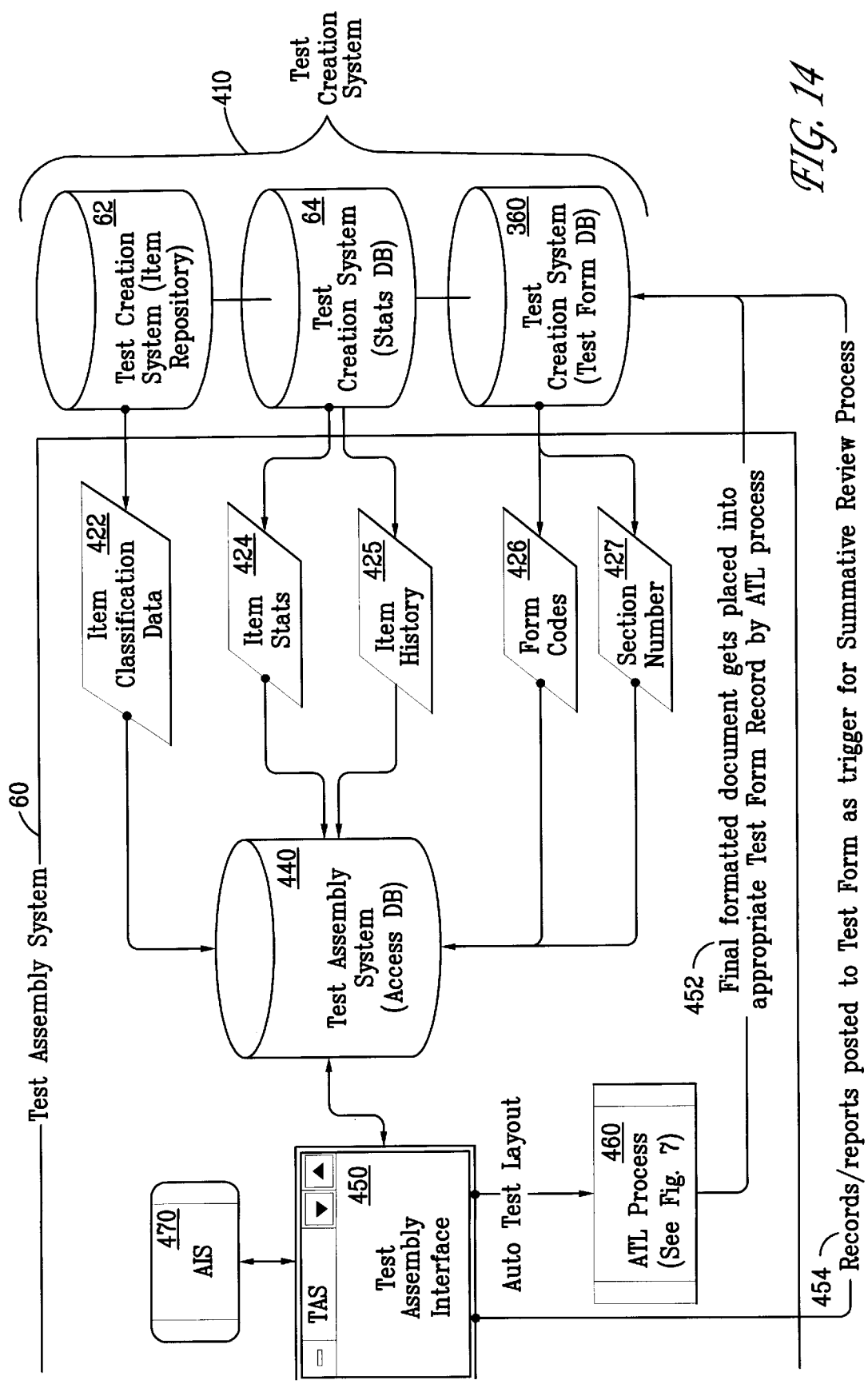
FIG. 14 is a system block diagram depicting the detailed data relationships between the TCS and the TAS of the invention.

FIG. 14 shows a system block diagram depicting the detailed data relationships between the TCS 410 and the TAS 400 of the invention. As described with respect to FIG. 3, information from the TCS 410 gets pumped to the Access Database 440 of the TAS 60. Item classification data 422 is retrieved from the item repository 62, item statistics 424 and item history 425 are retrieved from the statistics database 64, and form codes 426 and section numbers 427 are retrieved from the test forms database 360. This information is fed into the Access database of the TAS 440 of the TAS 60, where it is accessed by the TAS interface 450 of the invention and used by the AIS 470 and the ATL process 460. From the ATL process 460, the final formatted document 452 (or assembled test) is then placed into the appropriate test form record in the test forms database 360. From the TAS interface 450, records and reports 454 for the assembled test 452 are then sent to the appropriate test form record in the test forms database 360.

Figure 15A:
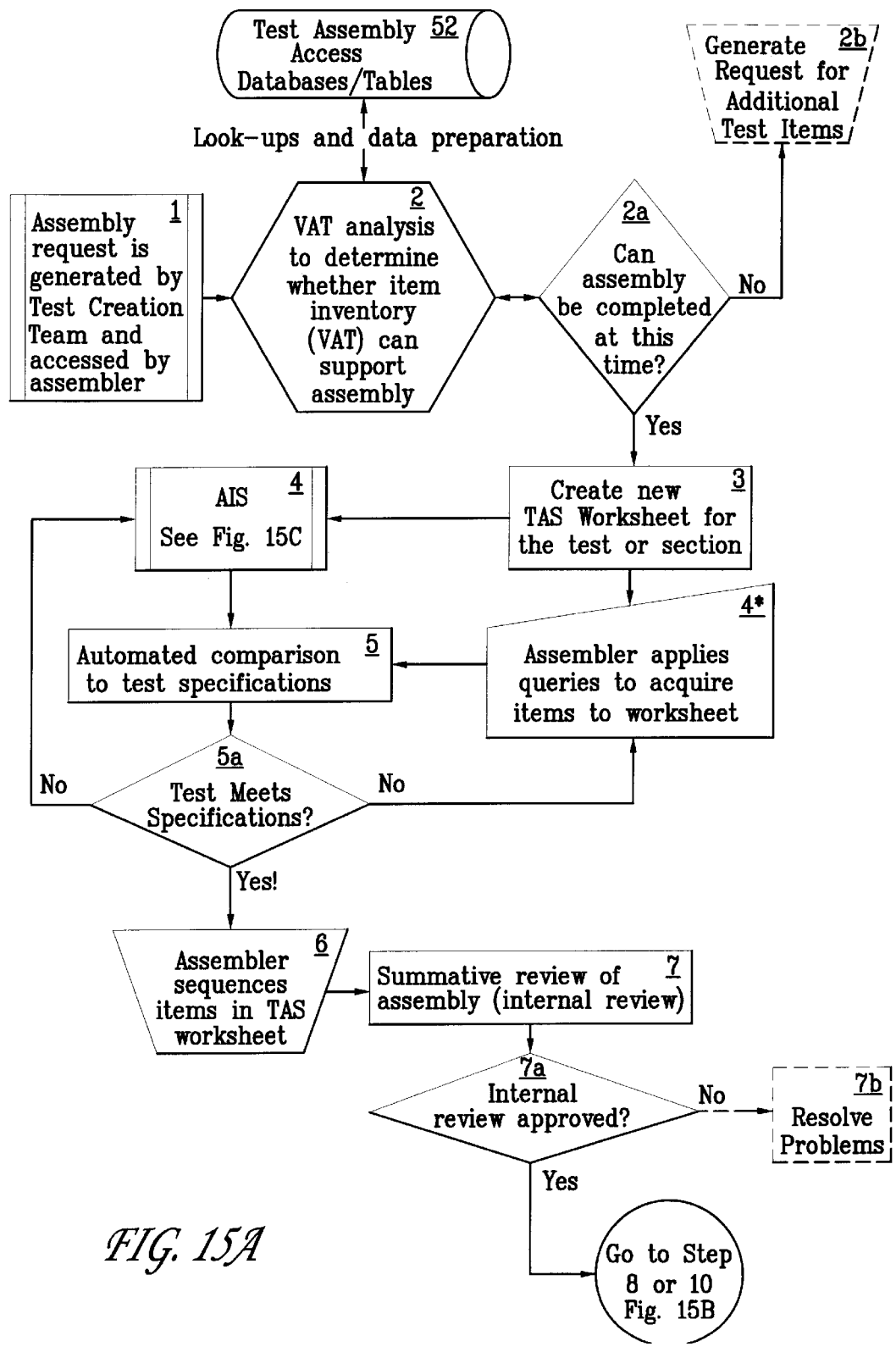
FIGS. 15A, 15B and 15C depict a detailed functional flow diagram for a preferred embodiment of the TAS of the invention.
Figure 15B:
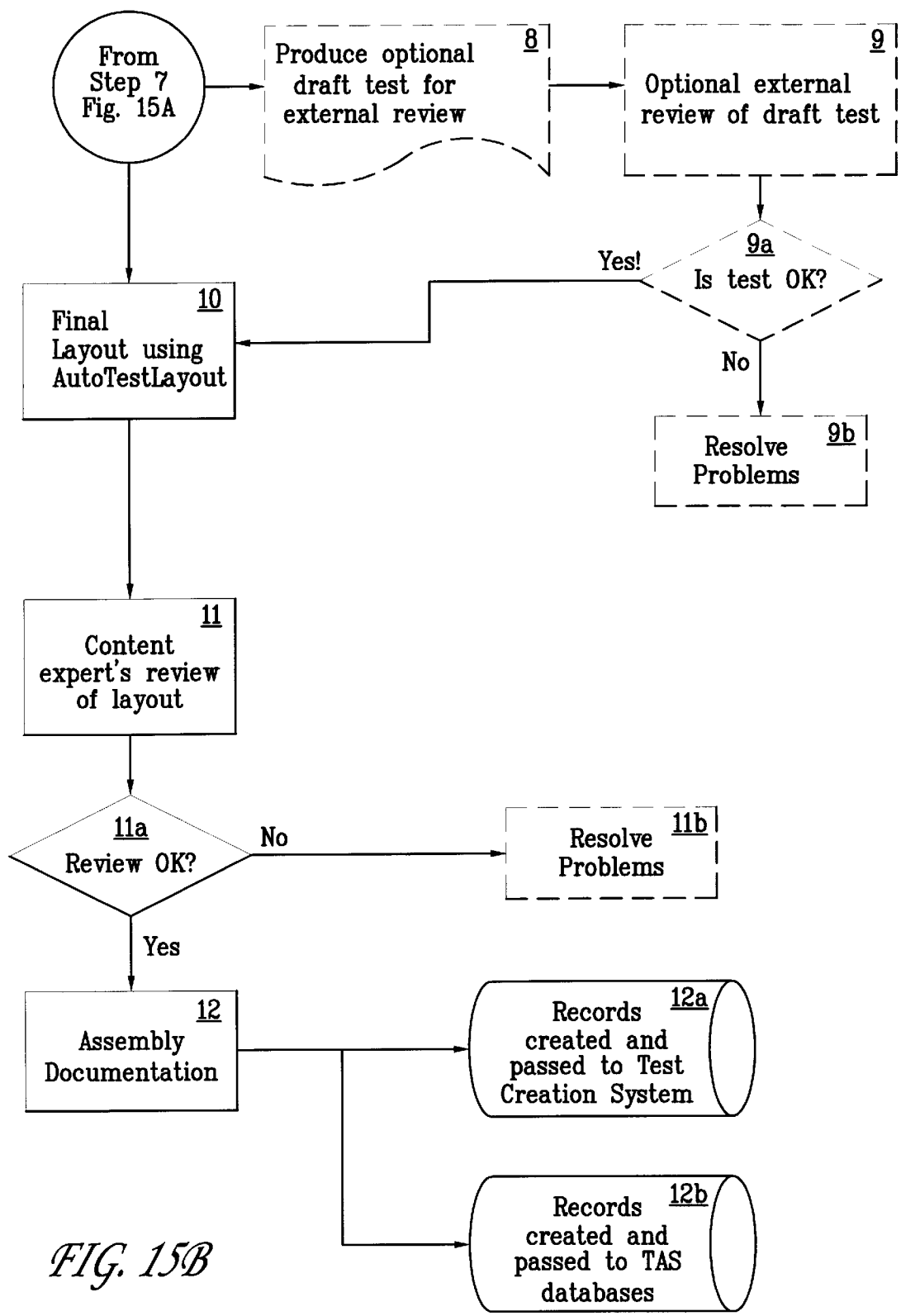
Figure 15C:
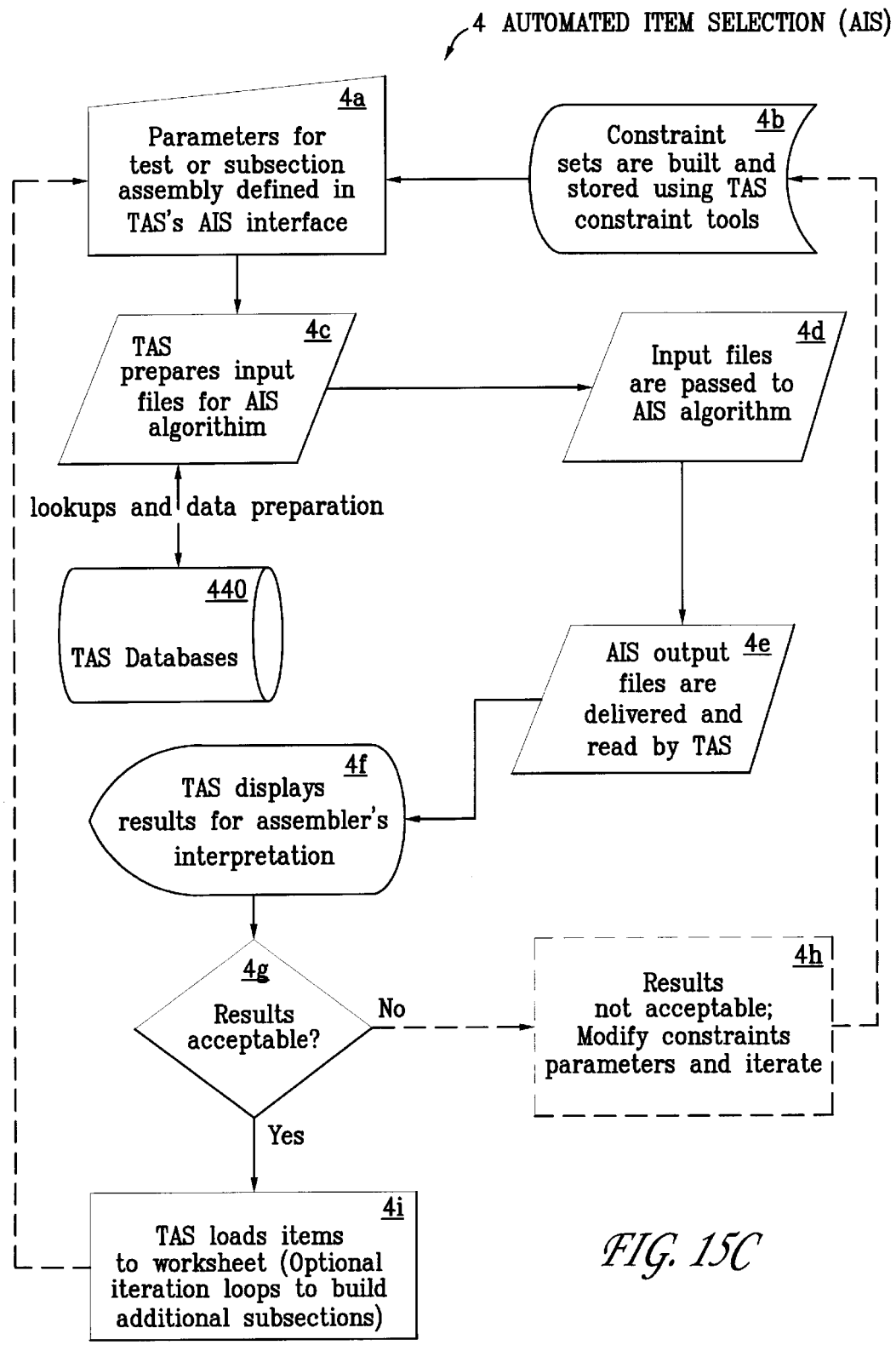

A detailed functional flow diagram of the TAS process is depicted in FIGS. 15A, 15B and 15C. As shown in FIG. 15A, the TAS starts at step (1), where the test creation team requests a test assembly. This step (1) involves the test creation team preparing specific information on the desired test and logging the information into a test planning system of the TCS. The TCS also generates test form records at this point.

At step (2), the inventory manager or assembler initiates inventory analyses to determine whether the item VAT, i.e., inventory of available items, can support the requested assembly. The inventory analyses are generated through either trial runs of AIS or through graphical reports of inventory holdings. To accomplish this, the TAS functions will look up item inventory information from the TAS Access databases 52.

If it is determined at step (2a) that the inventory of available items (VAT) is not adequate to support the assembly request, additional test items are requested from content teams at step (2b) using the TAS reporting tools. However, if the VAT is adequate, a new TAS worksheet is created for the test or test section at step (3). The creation of an empty worksheet is tied to test form code information and creates a link between the TAS and TCS test form records.

At step (4), an assembler uses sets of saved constraints and the AIS interface screens to create an automated assembly request. Resulting item sets are posted to the worksheet while items are reviewed on-line. The individual steps in the AIS process are described below with reference to FIG. 15C.

Alternatively, an assembler may use queries to acquire items for the worksheet at step **(4\*)**. This manual, but on-line, technique does not make use of the AIS component of the TAS and involves an assembler composing and executing a series of query statements. As with using constraints, an assembler selects items from the query results to populate the worksheet while items are reviewed on-line.

At step (5), the TAS compares the worksheet contents to a saved constraint set containing test specifications and reports on the status of the assembly. With this automated comparison, an assembler can determine immediately if the specifications have been satisfied. If it is determined at step (5a) that the test specifications have not been met, the deviations are resolved by returning to step (4) or step **(4\*). The assembler, however, may confer with knowledgeable parties to determine if some deviations are acceptable. If they are acceptable, these determinations are documented in the assembly records archive, described below with reference to step (13). If the deviations are still not acceptable, the process returns to step (4) or step (4\*)**.

If the test meets specifications, an assembler sequences the test items in the TAS worksheet at step (6). This step (6) involves applying sequence numbers in the worksheet to put the items in the desired order.

After sequencing at step (6), at step (7) a content specialist performs a "summative review" of the entire test item set (not an item-by-item review). Very few changes to the assembly should be needed at this point. Problems are noted, and if internal review approval is not obtained at step (7a), the problems are resolved at (7b) through item replacement at step (4) or through the item evaluation (and change) process of the TCS.

If internal review approval is obtained at step (7a), control proceeds to step (8) of FIG. 15B. Step (8) is the optional production of a draft test layout for external review by using the TAS interface to the Auto TestLayout feature. This step (8) transforms the fully-formatted individual test items into a formatted draft test with all appropriate stylistics, headers, footers and other provisions.

Step (9) is the optional external review of the test layout by committees of experts. As with internal review, problems are noted and resolved at steps (9a) and (9b) through item replacement at step (4) or through the item evaluation (and change) process of the TCS.

The next step in the TAS process is the production of the final test layout using the Auto TestLayout process at step (10). Step (10) results in a final layout that meets all stylistic and test assembly requirements. In addition, the Auto TestLayout process automatically incorporates any changes to sequencing or items that were made at the review of the draft assembly at steps (7) and (9).

Step (11) is the quick on-line review of the final test layout by a content expert to ensure that no content-related problems are present. Final approval of assembly occurs at this point. As with the previous reviews, problems are noted and resolved at steps (11a) and (11b) through item replacement at step (4) or through the item evaluation (and change) process of the TCS.

The final step (12) in the TAS process is assembly documentation, wherein the TAS creates documentation of the completed assembly. The documentation includes copies of the formatted test document, SKM key files, data from the worksheet summary, reports of any changes made to the test items, special comments regarding the assembly entered by staff during the assembly process, and reports for the psychometric staff. This is all performed using a documentation component of the TAS. As part of this step (12), the TAS passes information on the assembled test, such as placeholder history and statistical records for the assembled test, to the TCS (step (12a)) and to the appropriate TAS databases (step (12b)), updating their records.

FIG. 15C provides a detailed flow diagram for the AIS process of the TAS process. As illustrated, the AIS process starts with the parameters for test or test section assembly that are defined in the TAS's AIS interface at step (4a). Constraint sets are then built and stored using constraint tools of the TAS at step (4b). The parameters from step (4a) and the constraint sets from step (4b) are then used by the TAS databases 440 to prepare input files for the AIS algorithm at step (4c).

After the input files are sent to the AIS algorithm at step (4d), the output files are returned to the TAS at step (4e) and displayed in a temporary worksheet at step (4f) for review by an assembler. If the results are not acceptable at step (4g), the assembler modifies the constraints or parameters at step (4h) to execute another AIS search. If the results are acceptable, the TAS loads the items into a target worksheet at step (4i). The process may then return to step 4(a) to repeat steps 4(a)–4(i) to build additional test sections or subsections.

G. State Diagram of the TAS

Figure 16:
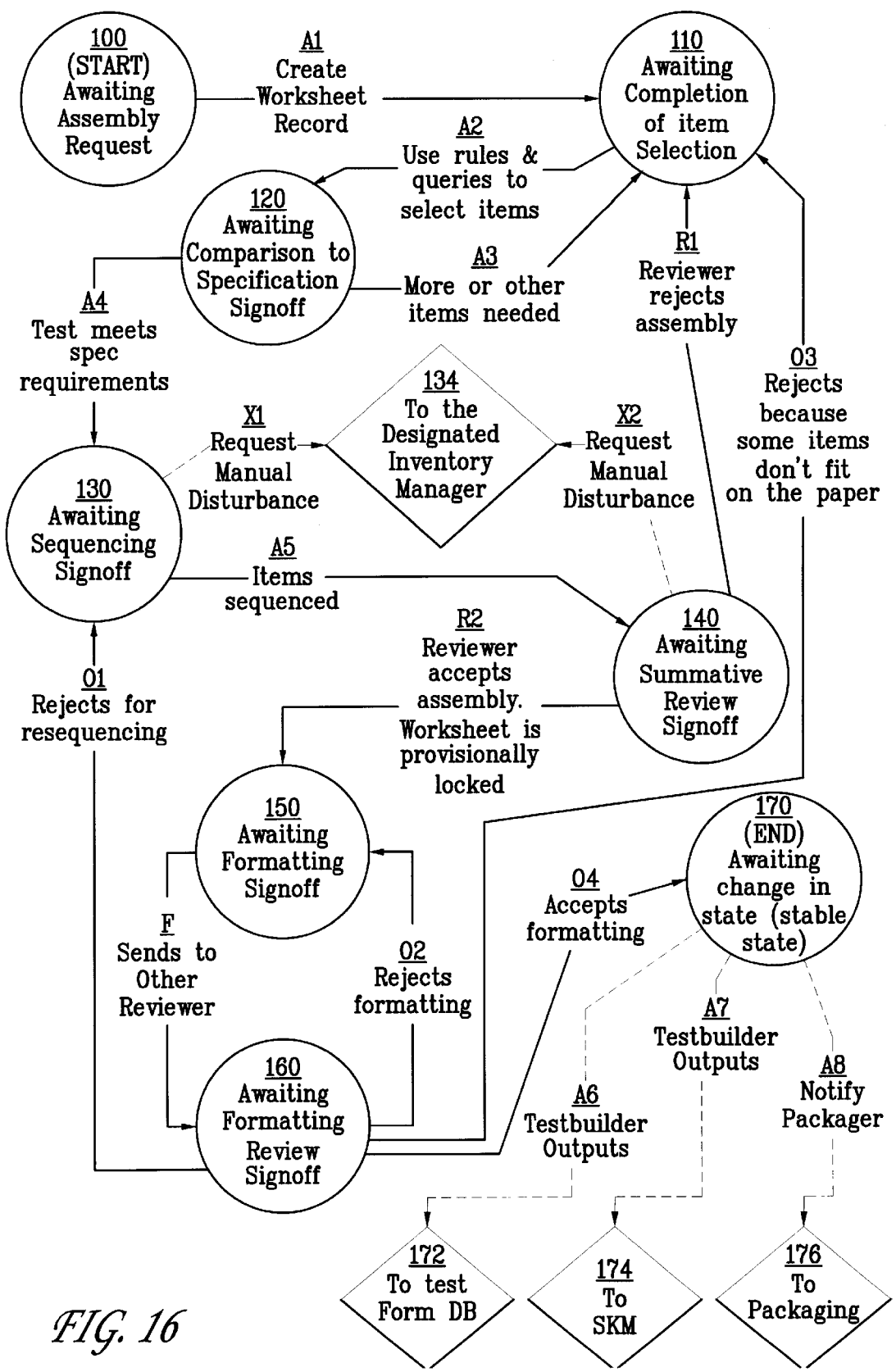
FIG. 16 is a state diagram for the TAS of FIG. 15.

A state diagram for the TAS is shown in FIG. 16. The steps from one state to another are performed by different personnel: A steps are performed by assemblers; F steps are performed by formatters; O steps are performed by reviewers other than assembly reviewers; R steps are performed by assembly reviewers; and X steps are performed by external personnel, i.e., off-line.

As shown in FIG. 16, the process begins with the state of awaiting assembly request 100. Once an assembly request is received from the test creation team, a worksheet record is created (A1). From the state of awaiting completion of item selection 110, rules and queries are used to select items (A2). The selected items are then compared to test specifications at the state of awaiting comparison to specifications signoff 120. From here, either different or additional items are needed (A3) or the test meets the specifications (A4) and then proceeds to the state of awaiting sequencing signoff 130.

From the state of awaiting sequencing signoff 130, the items are sequenced (A5) or a manual disturbance is sent (X1) to the designated inventory manager 134. From the state of awaiting summative review signoff 140, a reviewer rejects the assembly (R1) and the process returns to the state of awaiting completion of item selection 110; a reviewer accepts the assembly and provisionally locks the worksheet (R2); or a manual disturbance is sent (X2) to the designated inventory manager 134.

If the assembly is accepted (R2), control proceeds to the state of awaiting formatting signoff 150. From here, the formatter sends the assembly to another reviewer (F) at the state of awaiting formatting review signoff 160. From here, the other reviewer rejects for re-sequencing (O1), rejects the formatting (O2), rejects because some items don't fit on the paper (O3), or accepts the formatting (O4).

After formatting is accepted (O4), the assembly is complete and it arrives at the state of awaiting change in state 170, i.e., from an unstable state to a stable state. From here, a TestBuilder feature of the TAS which provides the TAS assembly documentation, sends outputs to the test forms database of the TCS 172 (A6) and to the SKM key files 174 (A7), while the assembly information is sent (A8) to packaging 176.

The Test Assembly System of the present invention streamlines the test assembly process by making the process more efficient and reduces the required number of steps and hand-offs than that required with the prior art TD/DC system. The steps of the TAS process are integrated and operate on compatible software platforms. The item selection process of the TAS is more efficient than that of the prior art and is more automated, allowing users to manipulate inventories of items on-line, thus achieving a finer level of granularity in narrowing down the number of test items in a given inventory before assembling a test.

With the use of the item classification structure, the TAS has achieved a greater level of efficiency in that an inventory of available items is provided with enough data on each item to allow for a more thorough, efficient and finer level of searching and selection. With the use of features such as the Auto TestLayout feature that streamlines the layout process and the TestBuilder feature that comprehensively documents assembly, the TAS of the present invention also improves the overall efficiency of the entire computer-based testing process as well as the assembly process. In general, the TAS provides a more efficient test assembly system than that of the prior art, improving all aspects of the test assembly system so as to yield an automated computer-based test assembly system with several automatic features.

It will be appreciated by those skilled in the art that the foregoing has set forth the presently preferred embodiment of the invention and an illustrative embodiment of the invention, but that numerous alternative embodiments are possible without departing from the novel teachings of the invention. All such modifications are intended to be included within the scope of the appended claims.

We claim:

1. A method of assembling a test on-line in electronic form using an automated test assembly system, comprising the steps of:

(a) developing at least one query in order to search an inventory of available test items for desired test items, said at least one query defining characteristics of desired test items that are needed for said test;

(b) inputting one query at a time into said test assembly system so as to yield a plurality of test items that satisfy each query;

(c) selecting a plurality of test items on-line from said plurality of test items that satisfy each query for storing in a worksheet; and (d) producing a test from said worksheet of test items, said test being a layout of the assembly of test items as it would appear during an administration of said test to test takers.

2. A method of assembling a test on-line in electronic form using an automated test assembly system, comprising the steps of:

(a) determining whether an inventory of available test items can satisfy a test assembly request;

(b) when said inventory is deemed satisfactory, creating a worksheet on-line for one of (1) a test and (2) a test section in which desired test items are to be assembled;

(c) selecting a plurality of test items on-line from said inventory for storing in said worksheet;

(d) sequencing said plurality of test items on-line in said worksheet so as to produce an assembly of test items;

(e) reviewing said assembly of test items on-line for one of (1) necessary changes in the assembly and (2) for problems with particular test items;

(f) making any necessary changes in the assembly and replacing test items having problems with new test items as necessary;

(g) producing a test, said test being a layout of the assembly of test items as it would appear during an administration of said test to test takers; and (h) storing on-line at least said test and data from said worksheet.

3. The method of claim 2, comprising the further step of requesting that additional items be stored in the inventory if it is determined at step (a) that the inventory is unsatisfactory.

4. The method of claim 2, wherein step (c) further comprises the steps of:

(c1) developing at least one constraint, said constraint defining at least one characteristic of test items that are needed for said test; and (c2) inputting said at least one constraint into an automated item selection algorithm which simultaneously finds test items that meet said at least one constraint and places said test items in a temporary worksheet for user evaluation.

5. The method of claim 4, wherein said step (c1) further comprises the step of placing an upper bound and a lower bound on the number of said test items for said automated item selection algorithm to find.

6. A method for assembling a test on-line in electronic form using an automated test assembly system, comprising the steps of:

developing at least one query in order to search an inventory of available test items for desired test items, said at least one query defining characteristics of desired test items that are needed for said test;

inputting one query at a time into said test assembly system so as to yield a plurality of test items that satisfy each query;

selecting a plurality of test items on-line from the plurality of test items that satisfy each query; and placing said selected test items in a worksheet for evaluation, said worksheet storing one of (1) a test and (2) a test section in which test items are to be assembled.

7. The method of claim 6, wherein said inputting step comprises the step of selectively refining said at least one query to further reduce the number of desired test items.

8. A method for automatically assembling a test on-line in electronic form using an automated test assembly system having a test item inventory, said test being a layout of the assembly of test items as said test items would appear during an administration of said test to test takers, comprising the steps of:

executing a plurality of layout macros in said test assembly system which direct the system to retrieve camera-ready versions of each test item which have been locked in said test item inventory and to place the locked, camera-ready versions in a predetermined sequence on an on-line test template; and editing said test template to produce a suitable layout of the test pages.

9. A computer based test assembly system for assembling a test on-line in electronic form, comprising:

an item repository for storing available test item information;

a statistics database for storing statistical information about available test items;

item selection software which selects a plurality of test items on-line for storing in a worksheet based on said statistical information;

a test layout feature for producing a test, said test being a layout of the assembly of said plurality of selected test items as said layout would appear during an administration of said test to test takers.

10. The test assembly system of claim 9, wherein the item selection software includes an automated item selection algorithm that yields test items that simultaneously meet a plurality of user-defined constraints.

11. A method of assembling a computer adaptive test on-line in electronic form using an automated test assembly system, the test being an adaptive layout of the assembly of test items as said layout would appear during an administration of said test to a particular test taker, the appearance of each successive test item being dependent on the manner in which the previous test item was answered, the method comprising the steps of:

(a) selecting a draft pool of test items through the specification of at least one constraint, said constraint defining at least one characteristic of test items that are needed for the test;

(b) setting up a simulation by selecting files to use for the simulation, whereby data from said files is collected for processing;

(c) performing analysis iterations on the draft pool of test items to determine fitness for use for the test;

(d) performing evaluation of the analysis iterations to determine an optimal pool; and (e) packaging and preparing files of data from said optimal pool for inclusion in a test module to be administered.

12. The method of claim 11, wherein step (a) further comprises the step of:

(a1) inputting said at least one constraint into an automated item selection algorithm which simultaneously finds said test items that meet said at least one constraint and places said test items in a temporary worksheet for user evaluation.

13. The method of claim 12, wherein said step (a1) further comprises the step of placing an upper bound and a lower bound on the number of said test items for said automated item selection algorithm to find.

14. A computer based test assembly system for assembling a test on-line in electronic form, comprising:

an item repository for storing available test item information;

a statistics database for storing statistical information about available test items;

item selection software which selects a plurality of test items on-line for storing in a worksheet based on said statistical information;

a test layout feature for producing a test, said test being an adaptive layout of the assembly of test items as said layout would appear during an administration of said test to a particular test taker, the appearance of each successive test item being dependent on the manner in which the previous test item was answered.

15. The test assembly system of claim 14, wherein the item selection software includes an automated item selection algorithm that yields test items that simultaneously meet a plurality of user-defined constraints.

\* \* \* \* \*